United States Patent
Aissi et al.

(10) Patent No.: US 9,547,769 B2
(45) Date of Patent: Jan. 17, 2017

(54) DATA PROTECTION HUB

(71) Applicant: VISA INTERNATIONAL SERVICE ASSOCIATION, San Francisco, CA (US)

(72) Inventors: Selim Aissi, Menlo Park, CA (US); Sekhar Nagasundaram, Newark, CA (US)

(73) Assignee: Visa International Service Association, San Francisco, CA (US)

( * ) Notice: Subject to any disclaimer, the term of this patent is extended or adjusted under 35 U.S.C. 154(b) by 639 days.

(21) Appl. No.: 13/935,311

(22) Filed: Jul. 3, 2013

(65) Prior Publication Data

US 2014/0013452 A1    Jan. 9, 2014

Related U.S. Application Data

(60) Provisional application No. 61/667,822, filed on Jul. 3, 2012.

(51) Int. Cl.
| | |
|---|---|
| H04L 29/06 | (2006.01) |
| G06F 21/60 | (2013.01) |
| G06F 21/85 | (2013.01) |
| G06F 7/04 | (2006.01) |
| G06F 17/30 | (2006.01) |
| H04N 7/16 | (2011.01) |

(52) U.S. Cl.
CPC ........... G06F 21/604 (2013.01); G06F 21/602 (2013.01); G06F 21/85 (2013.01); H04L 63/0428 (2013.01); H04L 63/20 (2013.01)

(58) Field of Classification Search
None
See application file for complete search history.

(56) References Cited

U.S. PATENT DOCUMENTS

| | | | |
|---|---|---|---|
| 5,613,012 | A | 3/1997 | Hoffman |
| 5,781,438 | A | 7/1998 | Lee |
| 5,883,810 | A | 3/1999 | Franklin |

(Continued)

FOREIGN PATENT DOCUMENTS

| | | |
|---|---|---|
| EP | 2156397 A1 | 2/2010 |
| JP | 11-068730 | 3/1999 |

(Continued)

OTHER PUBLICATIONS

International Search Report and Written Opinion mailed Oct. 18, 2013 in PCT/US2013/049332, 9 pages.

(Continued)

*Primary Examiner* — Shin-Hon Chen
(74) *Attorney, Agent, or Firm* — Kilpatrick Townsend & Stockton LLP

(57) ABSTRACT

Embodiments of the invention broadly described, introduce systems and methods for protecting data at a data protection hub using a data protection policy. One embodiment of the invention discloses a method for protecting unprotected data. The method comprises receiving a data protection request message comprising unprotected data and one or more policy parameters, determining a data protection transformation using the policy parameters, performing the data protection transformation on the unprotected data to generate protected data, and sending the protected data.

10 Claims, 17 Drawing Sheets

(56) References Cited

U.S. PATENT DOCUMENTS

| | | |
|---|---|---|
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,840,595 B1* | 11/2010 | Blitzer ............... G06F 11/1458 707/781 |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1* | 6/2013 | Palgon ............... G06F 21/00 380/277 |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |

(56) References Cited

U.S. PATENT DOCUMENTS

| | | |
|---|---|---|
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0123461 A1* | 6/2006 | Lunt ................. G06F 21/6254 726/1 |
| 2006/0235795 A1 | 10/2006 | Johnson |
| 2006/0237528 A1 | 10/2006 | Bishop |
| 2006/0278704 A1 | 12/2006 | Saunders |
| 2007/0091790 A1* | 4/2007 | Passey ................ G06F 11/1662 370/217 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0319773 A1 | 12/2009 | Frenkel et al. |
| 2009/0319786 A1* | 12/2009 | Viscomi ............. G06F 9/44521 713/165 |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |

(56) References Cited

U.S. PATENT DOCUMENTS

| | | |
|---|---|---|
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0289565 A1* | 11/2011 | Resch .................... H04L 9/085 726/5 |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0066769 A1* | 3/2012 | Latchem ............ G06F 21/6245 726/26 |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0311345 A1* | 12/2012 | Dhuse ................ G06F 21/6218 713/189 |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |

(56) References Cited

U.S. PATENT DOCUMENTS

| | | |
|---|---|---|
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| JP | 2001-223729 A | 8/2001 |
| KR | 10-1996-0015309 A | 5/1996 |
| KR | 10-2009-0061253 A | 6/2009 |
| WO | 0135304 A1 | 5/2001 |
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288, Payment System Canonical Address Format filed May 19, 2014, unpublished.

Sharma et al., U.S. Appl. No. 62/003,717, Mobile Merchant Application filed May 28, 2014, unpublished.

Kalgi et al., U.S. Appl. No. 62/024,426, Secure Transactions Using Mobile Devices filed Jul. 14, 2014, unpublished.

Prakash et al., U.S. Appl. No. 62/037,033, Sharing Payment Token filed Aug. 13, 2014, unpublished.

Hoverson et al., U.S. Appl. No. 62/038,174, Customized Payment Gateway filed Aug. 15, 2014, unpublished.

Wang, U.S. Appl. No. 62/042,050, Payment Device Authentication and Authorization System filed Aug. 26, 2014, unpublished.

Gaddam et al., U.S. Appl. No. 62/053,736, Completing Transactions Without a User Payment Device filed Sep. 22, 2014, unpublished.

Patterson, U.S. Appl. No. 62/054,346, Mirrored Token Vault filed Sep. 23, 2014, unpublished.

Dimmick, U.S. Appl. No. 14/952,514, Systems Communications With Non-Sensitive Identifiers filed Nov. 25, 2015, unpublished.

Dimmick, U.S. Appl. No. 14/952,444, Tokenization Request Via Access Device filed Nov. 25, 2015, unpublished.

Prakash et al., U.S. Appl. No. 14/955,716, Provisioning Platform for Machine-To-Machine Devices filed Dec. 1, 2015, unpublished.

Wong et al., U.S. Appl. No. 14/966,948, Automated Access Data Provisioning filed Dec. 11, 2015, unpublished.

Stubbs et al., U.S. Appl. No. 62/103,522, Methods and Systems for Wallet Provider Provisioning filed Jan. 14, 2015, unpublished.

McGuire, U.S. Appl. No. 14/600,523, Secure Payment Processing Using Authorization Request filed Jan. 20, 2015, unpublished.

Flurscheim et al., U.S. Appl. No. 15/004,705, Cloud-Based Transactions With Magnetic Secure Transmission filed Jan. 22, 2016, unpublished.

Flurscheim et al., U.S. Appl. No. 62/108,403, Wearables With NFC HCE filed Jan. 27, 2015, unpublished.

Sabba et al., U.S. Appl. No. 15/011,366, Token Check Offline filed Jan. 29, 2016, unpublished.

Patterson, U.S. Appl. No. 15/019,157, Token Processing Utilizing Multiple Authorizations filed Feb. 9, 2016, unpublished.

Cash et al., U.S. Appl. No. 15/041,495, Peer Forward Authorization of Digital Requests filed Feb. 11, 2016, unpublished.

Le Saint et al., U.S. Appl. No. 15/008,388, Methods for Secure Credential Provisioning filed Jan. 27, 2016, unpublished.

Kinagi, U.S. Appl. No. 62/117,291, Token and Cryptogram Using Transaction Specific Information filed Feb. 17, 2015, unpublished.

Galland et al. U.S. Appl. No. 62/128,709, Tokenizing Transaction Amounts filed Mar. 5, 2015, unpublished.

Rangarajan et al., U.S. Appl. No. 61/751,763, Payments Bridge filed Jan. 11, 2013, unpublished.

Li, U.S. Appl. No. 61/894,749, Methods and Systems for Authentication and Issuance of Tokens in a Secure Environment filed Oct. 23, 2013, unpublished.

Aissi et al., U.S. Appl. No. 61/738,832, Management of Sensitive Data filed Dec. 18, 2012, unpublished.

Wong et al., U.S. Appl. No. 61/879,362, Systems and Methods for Managing Mobile Cardholder Verification Methods filed Sep. 18, 2013, unpublished.

Powell, U.S. Appl. No. 61/892,407, Issuer Over-The-Air Update Method and System filed Oct. 17, 2013, unpublished.

Powell, U.S. Appl. No. 61/926,236, Methods and Systems for Provisioning Mobile Devices With Payment Credentials and Payment Token Identifiers filed Jan. 10, 2014, unpublished.

Petition for Inter Partes Review of U.S. Pat. No. 8,533,860 Challenging Claims 1-30 Under 35 U.S.C. § 312 and 37 C.F.R. § 42.104,

(56) References Cited

OTHER PUBLICATIONS filed Feb. 17, 2016, Before the USPTO Patent Trial and Appeal Board, IPR 2016-00600, 65 pages.

* cited by examiner

DATA PROTECTION HUB

CROSS-REFERENCES TO RELATED APPLICATIONS

The present application is a non-provisional application of and claims priority to U.S. Provisional Application No. 61/667,822, filed on Jul. 3, 2012, the entire contents of which are herein incorporated by reference in their entirety for all purposes.

BACKGROUND

Ensuring security of data at rest and in transit continues to be a necessity. Implementing data security typically requires a high degree of investment in hardware, software, and the appropriate level of expertise to assess the security needs of the data that needs protection. Government or industry compliance standards may further increase the complexity and cost to implement data security.

There can be many different organizations that have different data protection requirements. Different organizations may include different divisions, projects and groups. Typically, each organization implements data security independently based on their needs. However, implementing independent solutions for each organization leads to a number of problems.

First, the differences in the security implementations inhibit flow of data securely between the different organizations. This is especially true if the flow of data occurs between organizations within a single corporation. Second, each implementation of data security may require expensive investment on the part of the organization. Third, varying implementations between the different organizations with varying level of expertise may lead to implementations that do not adhere to industry, national, and international standards and may expose the data to potential compromise.

Furthermore, some small merchants may not have the ability to access cryptographic services or other security solutions.

Embodiments of the invention address these and other problems.

SUMMARY

Embodiments of the invention broadly described, introduce systems and methods for protecting data at a data protection hub using a data protection policy.

One embodiment of the invention discloses a computer-implemented method for protecting data. The method comprises receiving a data protection request message comprising unprotected data and one or more policy parameters, determining a data protection transformation using the policy parameters, performing the data protection transformation on the unprotected data to generate protected data, and sending the protected data.

One embodiment of the invention discloses a data protection hub. The data protection hub comprises a processor and a non-transitory computer-readable storage medium, comprising code executable by the processor for implementing a method comprising receiving a data protection request message comprising unprotected data and one or more policy parameters, determining a data protection transformation using the policy parameters, performing the data protection transformation on the unprotected data to generate protected data, and sending the protected data.

One embodiment of the invention discloses a computer-implemented method for protecting unprotected data. The method comprises sending, by a processor, a data protection request message comprising unprotected data and one or more policy parameters, and receiving, by the processor, protected data, wherein the protected data is generated by a data protection transformation, wherein the data protection transformation is determined using the policy parameters.

Further details regarding embodiments of the invention can be found in the Detailed Description and the Figures.

DETAILED DESCRIPTION

Figure 1:
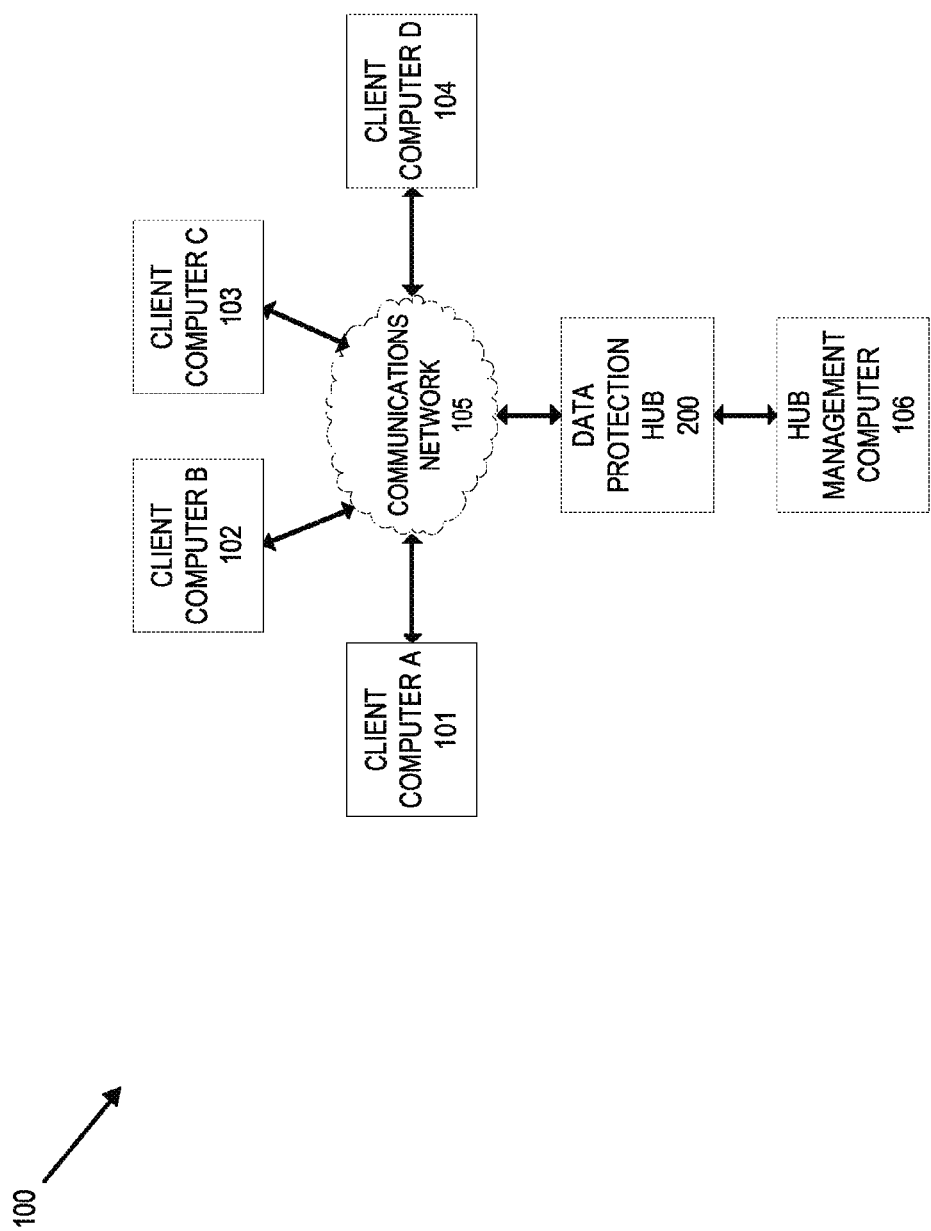
FIG. 1 shows a system according to an embodiment of the invention.

Prior to discussing embodiments of the invention, descriptions of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "unprotected data" may include any data that has not been protected, such that unauthorized use by an unauthorized person could cause harm to a person associated with the unprotected data. For example, unprotected data may include a primary account number for a credit card. If an unauthorized person uses the credit card number, potential harm could be done to the authorized person (e.g., the credit card holder) that is associated with the primary account number. Unprotected data may not have been transformed, obfuscated, encrypted, or otherwise protected by a data protection hub. Typically, unprotected data may be stored in cleartext, so that the information represented by the unprotected data is readily apparent. Examples of unprotected data may include: a numeric value representing an age of a customer, a string literal comprising a user's password or primary account number associated with a payment account, or a serialized object value (e.g., in JSON) comprising program state. In some cases, unprotected data may store sensitive information, so transmission of unprotected data over insecure communication networks and storage of unprotected data in insecure databases should be avoided.

The term "protected data" may include any data that has been protected by a data protection hub, typically by using a data protection transformation. In some embodiments, protected data may be considered safe to send over insecure communications networks or store in insecure databases.

A "data protection transformation" may include any transformation of unprotected data to protected data, such that information represented by the unprotected data is not readily apparent from the protected data. A data protection transformation may be a cryptographic operation such as encryption or cryptographic hashing. Alternately, the data protection algorithm may use other operations such as tokenization or data masking. In some embodiments, a data protection transformation may be a reversible transformation (e.g., tokenization or encryption), so that the original unprotected data may be derived using the protected data. In other embodiments, the data protection transformation may be an irreversible or substantially irreversible process (e.g., hashing or data masking), so that the original unprotected data may not be derived from the protected data.

The term "deprotected data" may include any data that is substantially unprotected but was previously protected. For example, a primary account number for a payment card may be "unprotected data," while the subsequent encryption of that primary account number may product an encrypted primary account number which is an example of "protected data" and the sequent decryption of the encrypted primary account number may be an example of "deprotected data." In this example, the "deprotected data" may also be "unprotected data."

The term "transformation data parameters" may include any parameters (e.g., secrets, or other data) used to perform a data protection transformation. For example, transformation data parameters for a hashing transformation may include the hashing algorithm (e.g., SHA-256 or SHA-512), a number of rounds of hashing to perform, and an output format of the hash. In some embodiments, transformation data parameters may also include information used to perform a data deprotection transformation. For example, transformation data parameters for an encryption algorithm may include a symmetric encryption algorithm (e.g., AES), and the encryption key, so that unprotected data may be determined by decrypting the protected data using the encryption key.

The term "data deprotection transformation" may include any transformation of protected data to unprotected data, such that the unprotected data was used to generate the protected data. A data deprotection transformation may typically be the inverse operation for the data protection transformation used to generate the protected data. For example, if the protected data was generated by symmetric encryption using a secret key, then the data deprotection transformation may be decryption using the secret key. The term "deprotection" may include any operation or transformation wherein unprotected data is determined from protected data.

Figure 2:
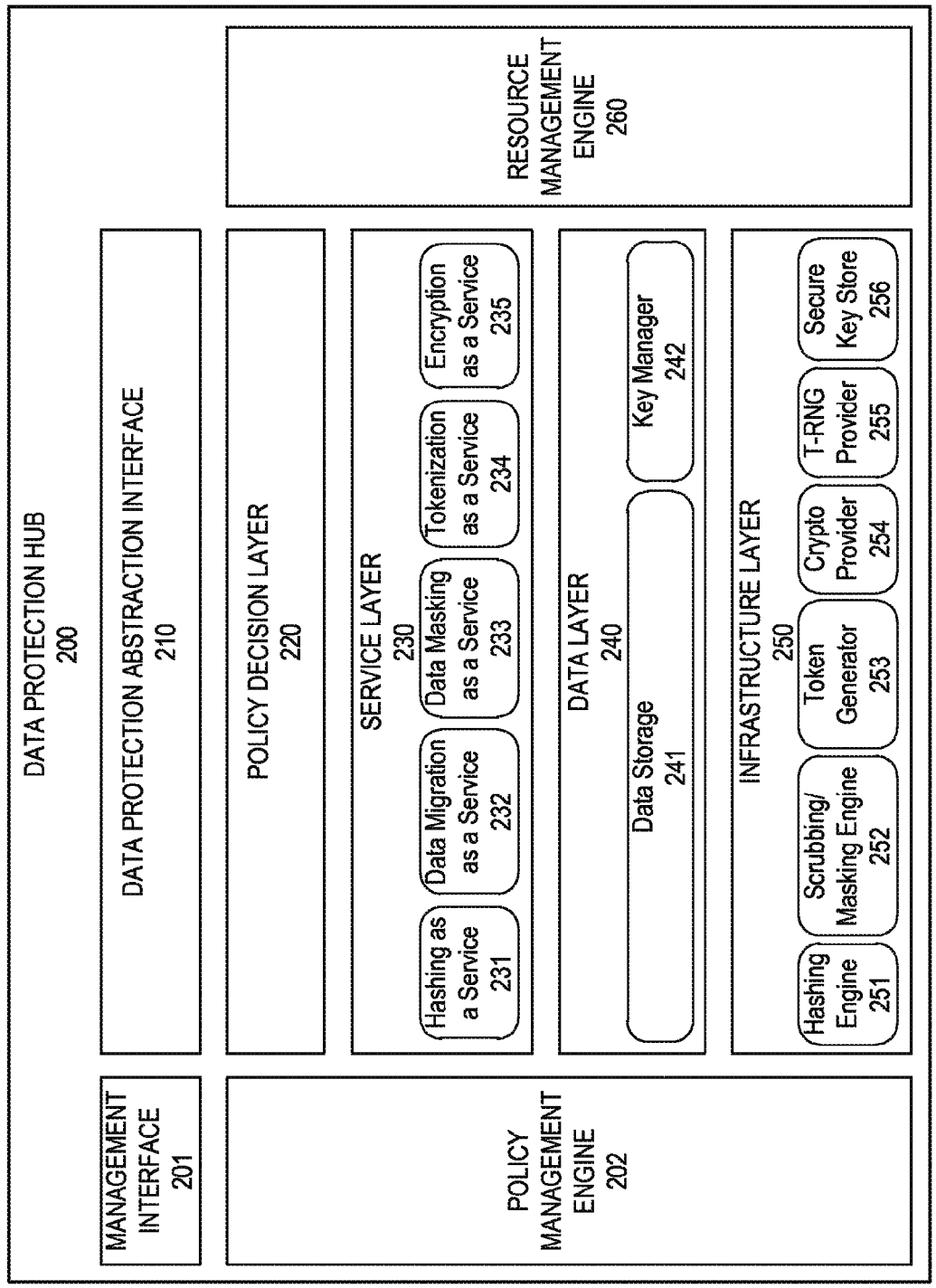
FIG. 2 shows one potential embodiment of a data protection hub.
Figure 3:
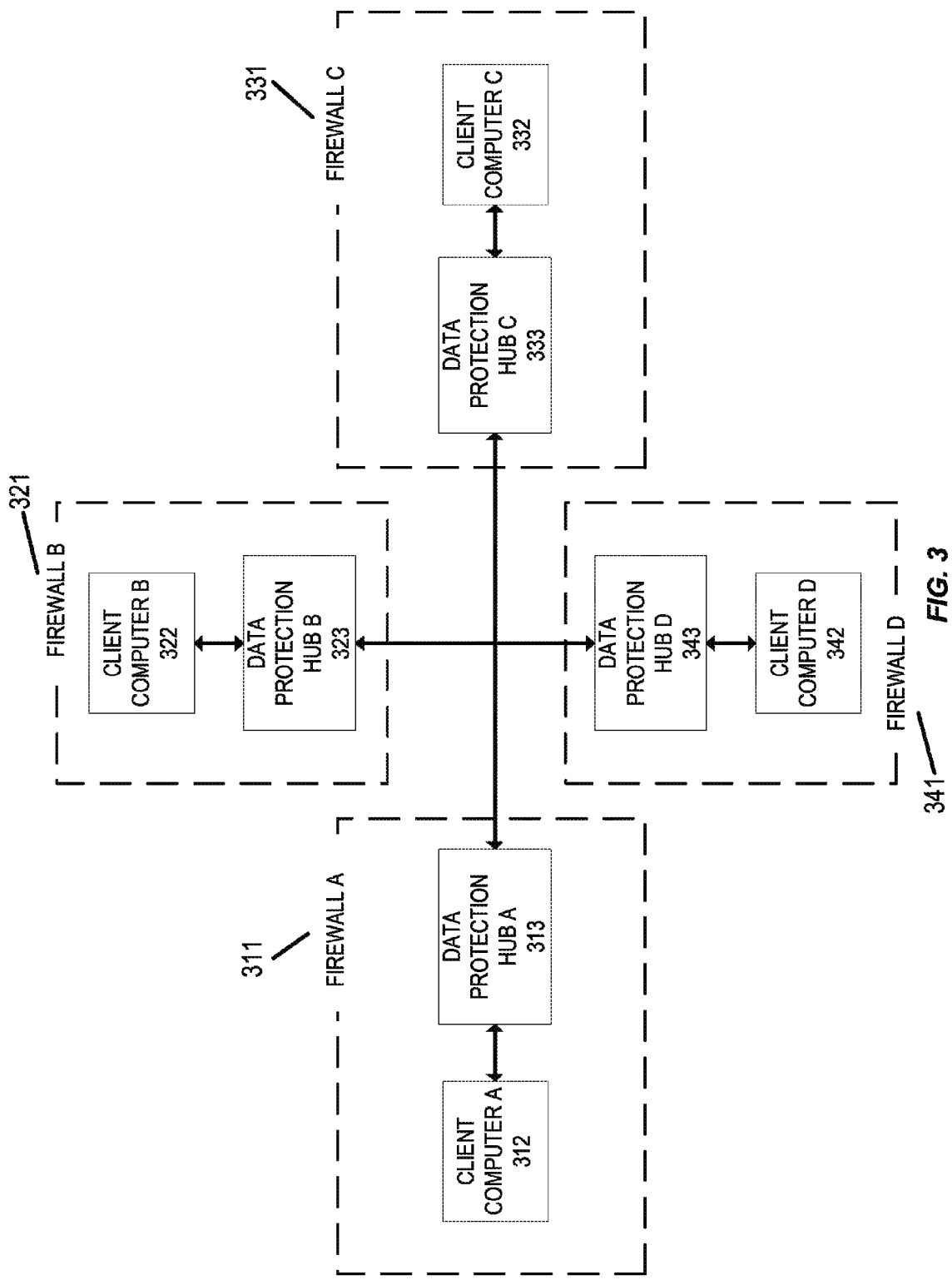
FIG. 3 shows one potential embodiment of a federated data protection hub.

The term "data protection hub" may include any suitable server computer or other computing device operable to receive requests for data protection and provide protected data. An exemplary data protection hub may determine protected data from received unprotected data and policy parameters. An exemplary data protection hub according to some embodiments of the invention is shown in FIG. 2. An exemplary federated data protection hub according to some embodiments of the invention is shown in FIG. 3.

The term "hub management computer" may include any suitable computing device used to generate or send a data protection policy file to a data protection hub. The hub management computer may connect to a data protection hub using a console, communications link, or any other suitable medium.

The term "data protection policy" may include any suitable procedure that is used to determine a data protection transformation for unprotected data. For example, the data protection policy may be used to determine that a user's password should be hashed, a user's social security number should be encrypted, and a user's credit card number should be tokenized. The data protection policy may also indicate the algorithms used to perform the data protection transformation (e.g, AES, SHA-256, RSA, etc.).

In some embodiments, the data protection policy may be determined using "policy parameters." In various embodiments of the invention, policy parameters may indicate a sensitivity of the unprotected data, a use case for the unprotected data, or a size of the unprotected data. For example, highly sensitive data such as a user's social security number may be encrypted with a 2048-bit key, whereas less sensitive data such as the user's first name may be encrypted with a 512-bit key. In another example, unprotected data which is intended to be sent over untrusted networks may be tokenized and stored at the data protection hub for recovery.

In some embodiments of the invention, a data protection policy may include some or all aspects of a compliance standard or data protection law, such as the Payment Card Industry Data Security Standard (PCI DSS), Health Insurance Portability and Accountability Act (HIPAA), Control Objectives for Information and Related Technology (COBIT), and the European Data Protection Directive.

The term "data protection policy file" may include a data file used to store a data protection policy. A data protection policy file may be in any suitable format, such as a markup language (e.g., XML), a logical language (e.g., Prolog), or an imperative language (e.g., C++).

The term "policy schema" may include any specification or model used to indicate the policy parameters associated with a data protection policy. For example, a policy schema may indicate three levels of data sensitivity for unprotected data: personal account information (PAI), personally identifiable data (PII), and sensitive authentication information (SAD. Similarly, the policy schema may indicate two values indicating the reversibility of the transformation: a first value indicating that the data protection transformation should be reversible, and a second value indicating that the transformation should be irreversible. Accordingly, policy parameters would comprise a level of sensitivity and a value for the reversibility of the transformation.

In some embodiments of the invention, the policy schema may be defined as an XML schema. In such embodiments, policy parameters may be defined using an XML document conforming to the XML schema.

The term "client credentials" may include any data provided which allows a data protection hub to verify that a client computer is authorized to deprotect the protected data. Client credentials may comprise a user name and password, a digital signature, or any other suitable data.

The term "data migration" may include any process in which protected data is migrated from a first computing device to a second computing device, such that the second computing device may operate the data protection hub to perform data deprotection transformations on the protected data.

Embodiments of the invention provide for many technical advantages. For example, embodiments of the invention reduce the cost of developing, deploying, and maintaining multiple data protection services by providing a centralized data protection hub that may be utilized by any number of client computers for a variety of applications. The data protection hub may receive unprotected data and policy parameters in a generic format from a client computer, and appropriately perform a data protection transformation in order to generate protected data. Thus, each application may protect sensitive data without needing to implement or deploy independent instances of data protection services. This reduces code complexity (e.g., because only a single codebase needs to be maintained to implement data protection features), deployment costs (e.g., because a single physical or virtual server may provide services to several applications), and time to deploy new applications (e.g., because an existing data protection hub may be used to provide data protection to a new application with minimal changes).

Embodiments of the invention provide for the additional technical advantage of generating protected data in compliance with data protection policies specified by a number of heterogenous users. It may be desirable to maintain a consistent data protection policy encompassing multiple applications for several reasons. For example, industry standards or governmental regulations may place constraints on protected data or data protection transformations used to generate protected data. These constraints may depend on various characteristics of the data, such as the nature of sensitive information stored or the potential for compromise associated with the protected data. The data protection hub may receive these characteristics as policy parameters from a client computer. The data protection hub may then determine a data protection transformation using the policy parameters. This enables applications to comply with a data protection policy by describing the characteristics of the data to be protected, without needing to independently develop software logic implementing the data protection policy. This further reduces software complexity and duplication of functionality between multiple applications conforming to a data protection policy. In addition, if a data protection policy is to be changed, the change may only need to be performed on the data protection hub; the change may be transparent to applications using the data protection hub as long as the policy parameters remain the same. This improves software reliability and longevity, since a data protection policy change at the data protection hub may not require any changes to applications using the data protection hub.

Embodiments of the invention provide for the additional technical advantage of providing an interface whereby a data protection policy may be reconfigured on-demand by a hub management computer. This allows the hub management computer to modify the data protection transformations to comply with new standards or regulations established after deployment of the data protection hub. In one example, a collision vulnerability may be found in a hashing algorithm used in a data protection transformation. Accordingly, the data protection policy may be modified to use a more secure hashing algorithm. In another example, a governmental organization may publish data protection standards specifying a longer minimum key length for data protection transformations relating to encryption. Accordingly, the data protection policy may be modified to use the longer key length. In a third example, the data protection policy may be modified to use higher-complexity data protection transformations (e.g., SHA-3 instead of SHA-2) as time passes and higher performance computing devices become available. Thus, allowing the data protection policy to be reconfigured allows data protection to be dynamically updated according to current needs, improving data security without requiring any changes to the data protection hub software.

Embodiments of the invention provide for the additional technical advantage of facilitating migration of protected data between client computers and applications. If data protection for each application is managed separately, then in order to migrate protected data from a first application to a second application, the data may be transformed to unprotected data by the first application, transmitted to the second application, and re-protected by the second application. This is inefficient, because it requires de-protecting and re-protecting the data and is insecure because the data is transmitted in an unprotected state. Alternately, the format of the protected data and any secret information (e.g., encryption or decryption keys, mappings between tokens and data values, etc.) may be transmitted with the protected data to the second application. However, this is also inefficient because a mapping, and insecure because transmitting the secret information may be a security liability.

For example, a first application may encrypt authentication data using the Advanced Encryption Standard (AES), and a second application may encrypt authentication data using the Data Encryption Standard (DES). If authentication data is to be shared between the applications, both applications may be configured to parse data encrypted using either algorithm. This increases software complexity and data storage requirements.

In contrast, embodiments of the invention enable secure and efficient migration of protected data. In some embodiments, a first application may send a data migration request message to a data protection hub indicating the data to migrate. Then, the first application may send the protected data to the second application. Subsequently, the second application may use the protected data, for example by sending the protected data to the data protection hub for deprotection. Thus, security is maintained because any secret information remains at rest at the data protection hub. Further, the protected data does not need to deprotected and re-protected, improving the efficiency of the process.

The above examples highlight only a few of the advantages of protecting data at a data protection hub using a data protection policy.

I. Exemplary Data Protection Hub Systems

A system 100 for use of a data protection hub can be seen in FIG. 1. The system 100 includes a client computer A 101, client computer B 102, client computer C 103, client computer D 104, communications network 105, data protection hub 200, and hub management computer 107. As shown, data protection hub 200 may be in communication with each of the client computers 101, 102, 103, 104 and may service the requests to and from these client computers. Communications network 105 may facilitate data transmissions between client computers 101-104 and data protection hub 200. Client computers 101-104 may run one or more applications, which may connect to data protection hub 200 in order to perform various data protection services, such as protection of unprotected data, deprotection of protected data, and data migration.

A suitable communications network 105 may be any one and/or the combination of the following; a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol MAP), I-mode, and/or the like); and/or the like.

FIG. 2 shows one potential embodiment of a data protection hub 200. As depicted in FIG. 2, the data protection hub 200 may comprise several implantation layers, such as data protection abstraction interface 210, policy decision layer 220, service layer 230, data layer 240, and infrastructure layer 250. Data protection hub 200 may also comprise a management interface 201, a policy management engine 202, and a resource management engine 260. The various layers, interfaces, and engines may be embodied by computer code, residing on computer readable media.

Data protection abstraction interface 210 may comprise one or more APIs, protocols, or schemas used by client computers to send data protection requests, data deprotection requests, data migration requests, or other communication. Data protection abstraction interface 210 may be configured to parse and process such communication. In addition, data protection abstraction interface 210 may be used to send protected data, unprotected data, or other data to the various client computers such as client computer 101. Data protection abstraction interface 210 may typically comprise one or more networking or communication apparatuses which enable the data protection hub 200 to communicate with communications network 105. Typically, data protection requests and data deprotection requests from a client computer 101 may be forwarded to policy decision layer 220 for further processing.

Policy decision layer 220 may comprise program logic or other software configured to determine a data protection in accordance with a data protection policy. Policy decision layer 220 may determine policy parameters for a data protection request and communicate with policy management engine 202 to determine the corresponding data protection transformation. In some embodiments, policy decision layer 220 may determine a module in service layer 230 to be used.

Service layer 230 may comprise a plurality of service modules configured to provide various data protection, deprotection, or migration services.

For example, hashing as a service module 231 may be configured to hash unprotected data. Hashing as a service module 231 interface with hashing engine 251. Hashing may refer to any algorithm or function that takes as input data and returns a fixed-size bit string (i.e., a hash), or as otherwise known in the art. In various embodiments, hashing may be performed using SHA-2, MD5, bcrypt, Blowfish, or any other suitable method. For example, a user's password (e.g., "hunter2") may be hashed to generate a trusted hash (e.g., "a3b8919fcb9d2"). Subsequently, a password entered by the user may be compared to the trusted hash in order authenticate the user. In some embodiments, hashing as a service module 231 may be implemented in accordance with the method described in FIG. 7.

Data migration as a service module 232 may be configured to perform data migration operations on unprotected data. Data migration may include any process in which protected data is migrated from a first computing device to a second computing device, such that the second computing device may operate the data protection hub to perform data deprotection transformations on the protected data. For example, data migration as a service module 232 may be used to migrate a sensitive user account database between a first client computer and a second client computer. In some embodiments, data migration as a service module 232 may be implemented in accordance with FIG. 14.

Data masking as a service module 233 may be configured to perform masking of unprotected data. Data masking may refer to any algorithm or method for de-contexting or removing sensitive information from input data, or as otherwise known in the art. In some embodiments, sensitive data may be masked by removing parts or elements of the data. For example, a standard 16-digit credit card personal account number (PAN) (e.g., "4061-7240-6172-4061") may be masked by removing the seventh digit through the twelfth digit (e.g., "4061-72XX-XXXX-4061"). Thus, an attacker would not be able to cause harm with the remaining digits. In addition, in some embodiments, sensitive data may be protected by moving the data to a different context. For example, a PAN, account expiration date, and card verification value (e.g., CVV2) may be decontexted by appending the CVV2 to an address field associated with the card holder. Thus, an attacker not knowing the new context of the data would not be able to understand the de-contexted data.

In some embodiments, data masking as a service module 233 may communicate with policy decision layer 220 to determine sensitive data fields in the unprotected data. In addition, data masking as a service module 233 may use scrubbing/masking engine 252 to mask the unprotected data. In some embodiments, data masking as a service module 23 may be implemented in accordance with FIG. 8.

Tokenization as a service module 234 may be configured to perform tokenization of unprotected data and detokenization of protected data. Tokenization may include substituting a sensitive data element with a non-sensitive element and saving a mapping between the elements, or as otherwise known in the art. An authorized user may subsequently perform detokenization to retrieve the sensitive data using the token.

Any suitable data may be tokenized. For example, a sensitive 16-digit PAN (e.g., "4061-7240-6172-4061") may be tokenized to produce a token (e.g., "a349ba0530a41169083"). In some circumstances, the token may be used as a substitute for the PAN. For example, a user may use the token in order to pay for a transaction instead of providing the PAN. A trusted party, such as the issuer associated with the PAN, may subsequently detokenize the data to retrieve the PAN and process the payment transaction.

In some embodiments, tokenization as a service module 233 may communicate with policy decision layer 220 in order to determine a tokenization format for the protected data. In addition, tokenization as a service module 234 may use token generator 253 to generate cryptographically secure tokens. A mapping between tokens and the unprotected data may be stored in data storage 241. In some embodiments, tokenization as a service module 234 may be implemented in accordance with FIGS. 9 and 12.

Encryption as a service module 235 may be configured to perform encryption of unprotected data and decryption of protected data. Encryption may include any encoding of information so that unauthorized users cannot read it, but authorized users can, or as otherwise known in the art. In various embodiments of the invention, encryption may be perform using symmetric keys, or public/private key pairs. For example, a user's date of birth (e.g., "Jan. 2, 1934") may be encrypted using an encryption key to produce encrypted data (e.g., 0x34A69F), so that the encrypted data may be unreadable. An authorized user may then decrypt the data, so that the date of birth is readable.

Encryption as a service module 235 may communicate with policy decision layer 220 to determine an encryption format for the protected data and generate an encryption key. In addition, encryption as a service module 235 may encrypt the unprotected data using crypto provider 254. Encryption as a service module 235 may store the encryption key using key manager 242. In some embodiments, encryption as a service module 235 may be implemented in accordance with FIGS. 10 and 13.

Data layer 240 may be configured to store any data relating to the operation of data protection hub. Data layer 240 may comprise a data storage module 241 and a key manager module 242.

Data storage module 241 may store any suitable data stored by data protection hub 200. For example, in various embodiments of the invention, data storage module 241 may store data relating to the data protection policy, transformation data parameters, mappings between tokens and unprotected data, protected data, or any other suitable data.

Key manager 242 may be configured to store and retrieve any suitable data relating to encryption keys. For example, key manager 242 may store symmetric keys, public/private key pairs, or keys used to generate a keyed hash. In some embodiments, key manager 242 may manage one or more keys stored in secure key store 256. In such embodiments, key manager 242 may retrieve a key from a secure key store 256 when requested by the service layer 230.

Infrastructure layer 250 may comprise any software or hardware elements used to perform data protection operations. For example, infrastructure layer 250 may comprise a hashing engine 251, scrubbing/masking engine 252, token generator module 253, crypto provider module 254, true random number generator (T-RNG) module 255, or secure key store 256.

Hashing engine 251 may comprise any software or hardware element used to perform hashing operations. For example, hashing engine 251 may comprise a general-purpose graphics processing unit (GPGPU) or a CPU running hashing software, or specialized hardware configured to perform hashing operations. Typically, hashing as a service module 231 may communicate with hashing engine 251 in order to compute a hash value in a given format.

Scrubbing/masking engine 252 may comprise any software or hardware element used to perform scrubbing or masking of unprotected data. Typically, scrubbing/masking engine 252 may mask sensitive data fields specified by data masking as a service module 233.

Token generator module 253 may comprise any software or hardware element used to tokenize unprotected data. For example, token generator 253 may comprise a physical device configured to generate a sequence of cryptographic tokens. Alternately, tokens may be generated by software running in the data protection hub 200. Typically, token generator module 253 may generate a token used by assigned to an unprotected data value by tokenization as a service module 234.

Crypto provider module 254 may comprise any software or hardware element used to perform cryptographic operations. For example, crypto provider module 254 may comprise a secure cryptoprocessor such as a trusted platform module (TPM). Crypto provider module 254 may be operable to generate keys, encrypt or decrypt data, cryptographically hash data, or any other suitable operation. In some embodiments, crypto provider module 254 may be in communication with various other elements in the infrastructure layer 250, such as hashing engine 251 (e.g., when computing an HMAC), T-RNG provider 255 (e.g., when generating a random key), or secure key store 256 (e.g., when decrypting data using a key stored in the secure key store). Typically, crypto provider module 254 may be used by encryption as a service module 235 to encrypt unprotected data or decrypt protected data, or by hashing as a service 231 to compute hash-based message authentication codes (HMACs).

True random number generator (T-RNG) provider 255 may comprise any software or hardware element used to generate random or pseudorandom numbers. For example, T-RNG provider may comprise a hardware random number generator that generates random numbers from a physical phenomenon. In some embodiments of the invention, T-RNG provider may be used by crypto provider module 254 or secure key store 256 in order to ensure that a generated key is statistically random.

Secure key store 256 may comprise any software or hardware element to store cryptographic keys. For example, secure key store 256 may comprise a hardware security module (HSM) operable to manage and store cryptographic keys. In some embodiments of the invention, secure key store 256 and crypto provider 254 may be integrated, so that cryptographic operations using keys stored in secure key store 256 may be performed using crypto provider 254. Typically, secure key store 256 may be used by encryption as a service module 235 to store encryption keys, or by tokenization as a service module 234 to store tokenization root keys.

In some embodiments of the invention, the various elements in infrastructure layer 250 may be duplicated. For example, the number of crypto providers 254 and secure key stores 256 may be scaled depending on the number of keys stored by data protection hub 200.

Data protection hub 200 may also comprise a management interface 201, a policy management engine 202.

Management interface 201 may comprise any suitable API, protocol, or schema used by a hub management computer 106 to interface with data protection hub 200. For example, management interface 201 may comprise a web interface such as a web site, a console, or a management API.

Policy management engine 202 may be configured to manage data protection policy settings associated with the data protection hub 200. Data protection policies may include any suitable procedures that are used to determine a data protection transformation for unprotected data. For example, the data protection policy may be used to determine an appropriate data protection transformation for a user's password (e.g., hashing), a user's social security number (e.g., encryption), or a user's credit card number (e.g., tokenization). The data protection policy may also indicate the algorithms used to perform the data protection transformation (e.g, AES, SHA-256, RSA, etc.).

In some embodiments, the data protection policy may be determined using "policy parameters." In various embodiments of the invention, policy parameters may indicate a sensitivity of the unprotected data, a use case for the unprotected data, or a size of the unprotected data. For example, highly sensitive data such as a user's social security number may be encrypted with a 2048-bit key, whereas less sensitive data such as the user's first name may be encrypted with a 512-bit key. In another example, unprotected data which is intended to be sent over untrusted networks may be tokenized and stored at the data protection hub for recovery.

Policy management engine 202 may be parse a data protection policy file and publish a policy schema comprising policy parameters to be used by client computers.

Resource management engine 260 may be configured to manage access to computing resources for various layers, services, modules, and other elements in the data protection hub 200. In some embodiments, the data protection hub may be deployed to a cloud or virtualized environment, so that layers and/or modules may be implemented using virtual machines (VMs). In such embodiments, resource management engine 260 may be used to ensure each element has sufficient resources to operate. For example, if a VM comprising the encryption as a service module 235 is being heavily utilized, resource management engine 260 may increase the number of cores or amount main memory allotted to the VM. Alternately, resource management engine 260 may spawn another instance of the VM, so that utilization of the encryption as a service module 235 may be split among the VMs.

Resource management engine 260 may also be responsible for managing physical hardware or other infrastructure associated with the data protection hub 200. For example, if the HSMs implementing the secure key store 256 are approaching maximum capacity, resource management engine 260 may move VMs to physical servers with empty HSMs or may indicate to IT or other personnel that additional HSMs need to be procured.

II. Exemplary Federated Hub Systems

In some embodiments of the invention, the data protection hub 200 may be distributed across multiple network environments. For example, data protection hub 200 may service client computers in different network tiers, subnets, or contained inside different firewalls. In such embodiments, the same data protection hub 200 may be federated; one or more instantiations of the data protection hub 200 may be run locally to a network environment, so that the instantiation services local client computers. The federated instantiations may maintain communication with each other, so that data may be synchronized between the instantiations. Thus, the federated instantiations of the data protection hub 200 may behave like a single data protection hub 200 while providing local access to client computers in different network environments.

FIG. 3 shows one potential embodiment of a federated data protection hub. The federated data protection hub comprises data protection hub A 313, data protection hub B 323, data protection hub C 333, and data protection hub D 343. In some embodiments, each data protection hub instantiation 313, 323, 333, and 343 may have the structure described for FIG. 2, and the descriptions are herein incorporated. Each data protection hub instantiation in communication with a corresponding client computer and is enclosed in a separate network firewall. For example, firewall A 311 includes client computer 312 and data protection hub 313. In addition, each data protection hub instantiation is in communication with the other instantiations.

III. Exemplary Data Protection Policy Methods

Figure 4:
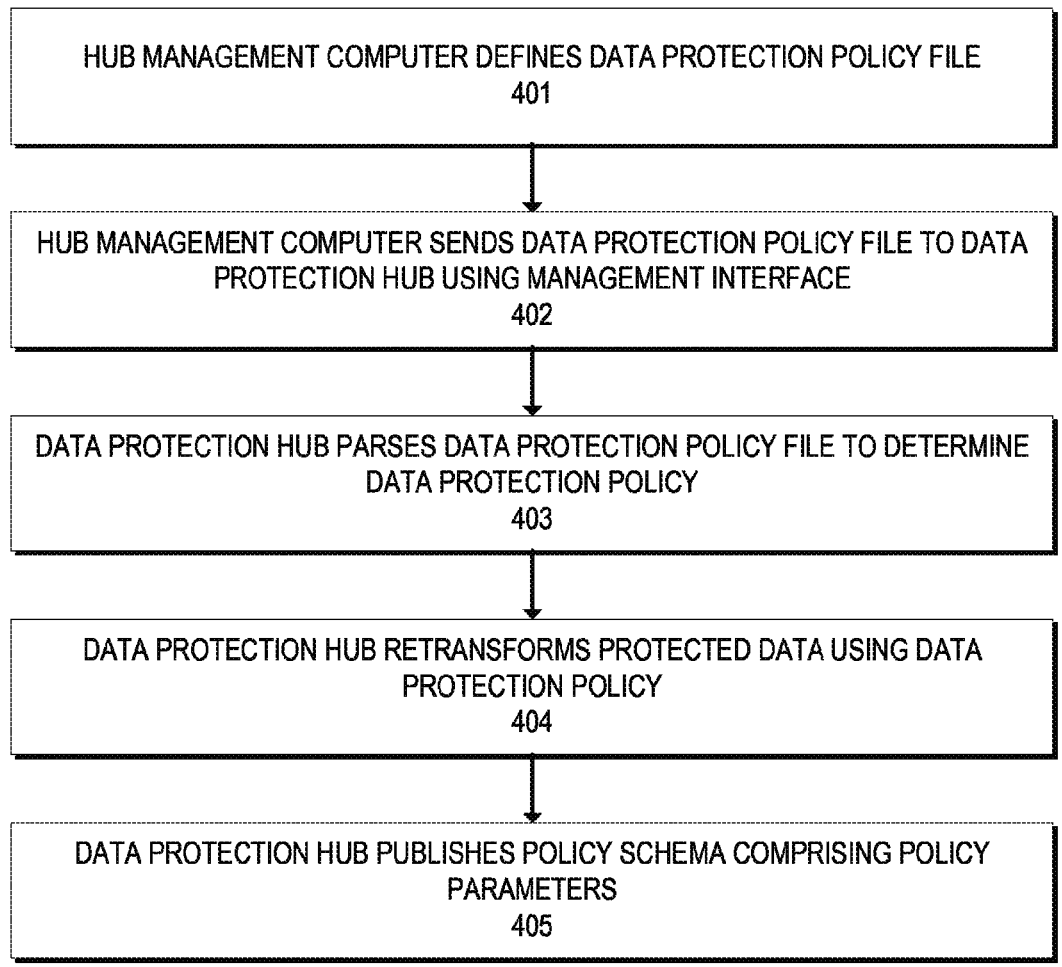
FIG. 4 shows a method for a data protection hub to receive and process a data protection policy.

FIG. 4 shows a method for a data protection hub 200 to receive and process a data protection policy. The method of FIG. 4 may typically be performed any time the data protection policy is to be changed.

At step 401, hub management computer 106 defines a data protection policy file. A data protection policy file may include a data file used to store a data protection policy. The hub management computer 106 may define the data protection policy file using any suitable means. For example, the data protection policy file may be defined in accordance with one or more industry standards or governmental regulations. In some embodiments, a data protection policy file may indicate a conditional relationship between various policy parameters and a corresponding data protection transformation. An exemplary data protection policy is shown in FIG. 5.

Figure 5:
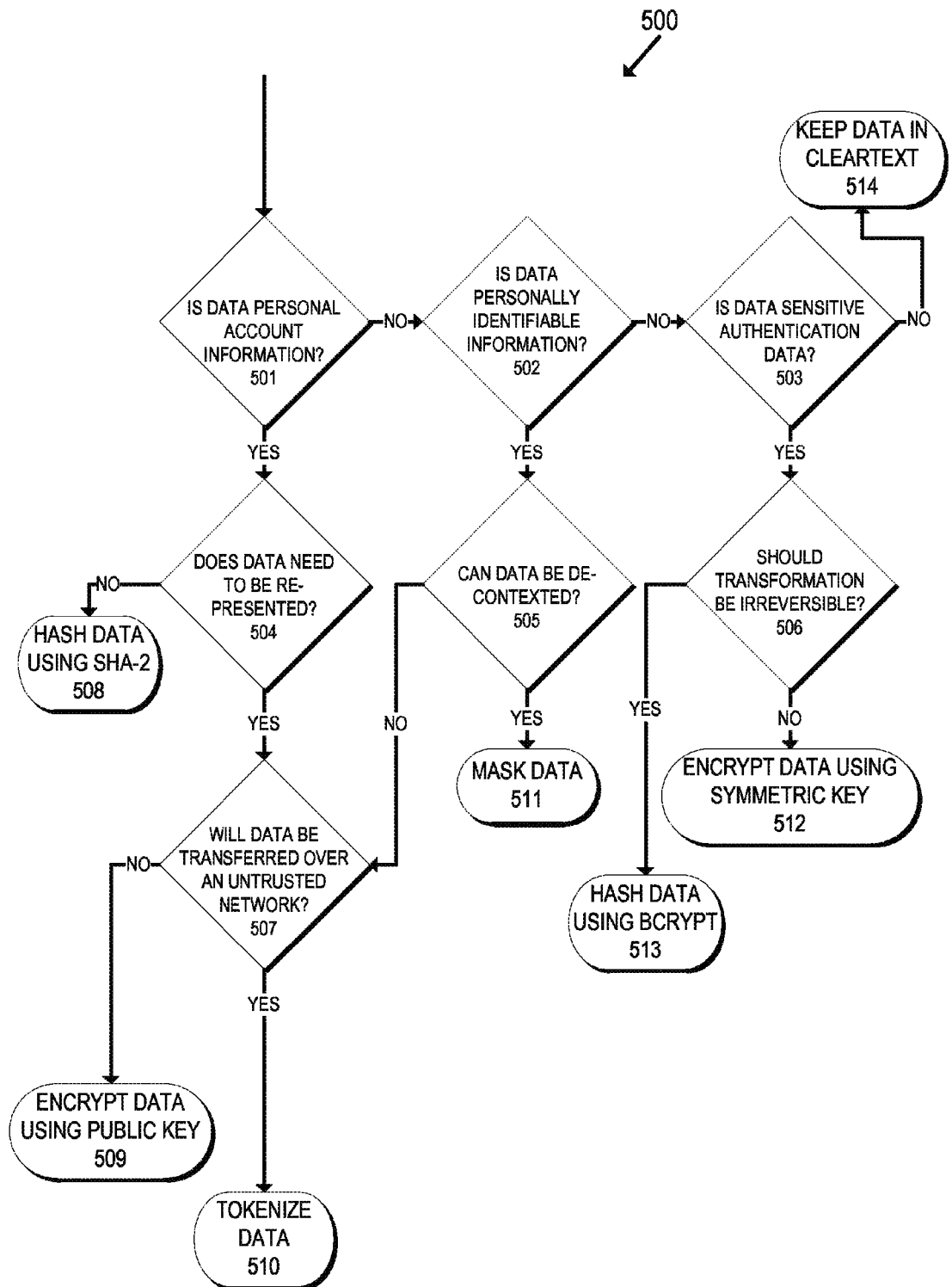
FIG. 5 shows a flow chart illustrating an exemplary data protection policy.

FIG. 5 shows a flow chart illustrating an exemplary data protection policy 500. The data protection policy 500 comprises a plurality of conditional expressions 501-507 used to determine a plurality of data protection transformations 508-513. The data protection policy may be used to determine a data protection transformation based on policy parameters associated with data to be protected. An exemplary evaluation of the data protection policy 500 is shown below.

At conditional step 501, data protection hub 200 determines if the data to be protected is personal account information. As used herein, "personal account information" may include data relating to an account operated by a user. For example, for a credit card account, personal account information may include a primary account number (PAN), an expiration date of a credit card, and a name printed on the card. If the data to be protected is personal account information, the flow proceeds to step 504. Otherwise, the flow proceeds to step 502.

At conditional step 504, data protection hub 200 determines if the data needs to be re-presented. As used herein, data needs to be "re-presented" if the original, unprotected data must be derivable from the protected data. For example, an application may store a user's social security number in order to verify that the social security number on file matches a number provided by a user. In this case, the user's social security number may not need to be re-presented, since the actual value of the SSN does not need to be known to perform verification. In contrast, a card's expiration date may need to be re-presentable so that a new card can be printed and mailed in advance of the expiration date of the existing card. If the data to be protected does not need to be re-presented, at step 508 the data protection transformation is determined to be hashing using the SHA-2 hashing algorithm. Otherwise, the flow proceeds to step 507.

At conditional step 507, data protection hub 200 determines if the data will be transferred over an untrusted network. If the data will not be transferred over an untrusted network, then at step 509 the data protection transformation is determined to be encryption using a symmetric key. Otherwise, at step 510 the data protection transformation is determined to be tokenization.

At conditional step 502, data protection hub 200 determines if the data is personally identifiable information. As used herein, "personally identifiable information" (PII) may refer to information that may be used to identify a user but may not be unique to the account. For example, a home address or phone number associated with an account may be PII, since multiple accounts may share the same home address or phone number. If the data to be protected is personally identifiable information, the flow proceeds to step 505. Otherwise, the flow proceeds to step 503.

At conditional step 505, data protection computer 200 determines if the data to be protected can be de-contexted. As used herein, data may be "de-contexted" if parts of the data may be removed so that the data is no longer sensitive. For example, a 9-digit social security number may be de-contexted by keeping only the last four digits. If the data to be protected can be decontexted, at step 511 the data protection transformation is determined to be data masking. Otherwise, the flow proceeds to step 507, as described above.

At conditional step 503, data protection computer 200 determines if the data is sensitive authentication data. As used herein, "sensitive authentication data" may include any data which is used to verify the authenticity of a user. Examples of sensitive authentication data may include passwords, password recovery questions and answers, and secret keys. If the data to be protected is sensitive authentication data, the flow proceeds to step 506. Otherwise, at step 514, the data is kept in cleartext, because it is not sensitive.

At conditional step 506, data protection computer 200 determines if the data protection transformation should be reversible. As used herein, a "reversible transformation" generates protected data from unprotected data, wherein the protected data may be used to derive the unprotected data. Examples of irreversible or substantially irreversible data protection transformations may include one-way (i.e., cryptographic) hashing and data masking. Examples of reversible data protection transformations may include encryption and tokenization. In one embodiment, a data protection policy may specify that a data protection transformation should be irreversible if a compromise of the unprotected data would be considered a secret only known to the user. For example, it is generally accepted practice for a user's password to be secret to a user; thus, the password can be protected with an irreversible transformation. However, a user's password recovery security question may not be considered secret to the user; as such, the recovery question may be protected with a reversible transformation. If the transformation should be irreversible, at step 513 the data protection transformation is determined to be hashing using the bcrypt algorithm. Otherwise, at step 514, the data protection transformation is determined to be encryption using a public key associated with the user.

It should be noted that the exemplary data protection policy 500 shown in FIG. 5 is intended to be descriptive but not limiting. For example, data protection policies may comprise any suitable number and or type of conditions and data protection transformations for processing data. The types and numbers of conditions and transformations may be arbitrarily chosen by the user. In addition, data protection policies do not need to be represented as flow charts; they may be structured as tables, decision trees, using program code, or any in any other suitable format.

Returning to FIG. 4, at step 402 hub management computer 106 sends the data protection policy file to data protection hub 200 using a hub management interface 201. For example, in some embodiments, management interface 201 may comprise a web interface such as a web site connected to by client computer 101. Client computer 101 may use the website to define the data protection policy file, or upload the data protection policy file to the website.

At step 403, data protection hub 200 parses the data protection policy file to determine a data protection policy. In some embodiments, the data protection policy file may comprise an XML schema. In such embodiments, the XML schema may be parsed using any suitable means, such as a jQuery or another XML parsing library. The data protection policy may be integrated into policy management engine 202 and/or policy decision layer 220, so that any subsequent data protection and deprotection may be in accordance with the data protection policy.

At step 404, data protection hub 200 retransforms protected data using the determined data protection policy. Retransformation of the protected data may include ensuring that existing protected data is protected in accordance with the new data protection policy. For example, in some embodiments, data protection hub 200 may retrieve data stored in data storage module 241 and or key manager module 242. In one example, a new data protection policy may specify that encrypted data should be protected using 1024-bit length keys instead of 512-bit length keys as specified by the previous data protection policy. Accordingly, at step 404, data protection hub 200 may retrieve and decrypt protected data stored in data storage module 241 using 512-bit length keys stored in key manager 242. Data protection hub 200 may then generate new 1024-bit length encryption keys, re-encrypt the decrypted data, and store the encrypted data in data storage 241. Data protection hub 200 may also replace each 512-bit key with a corresponding 1024-bit key in key manager 242.

At step 405, data protection hub 200 publishes a policy schema comprising policy parameters. The policy schema may include any specification, model, or format used to indicate the policy parameters associated with a data protection policy. For example, a policy schema may indicate in an XML schema the policy parameters that may be used in accordance with the data protection policy 500. The XML schema may be published (e.g., made available to client computers such as client computers 101-104) using any suitable method. For example, data protection hub 200 may host the XML schema using a web interface (e.g., a web server). Alternately, wrapper source files, client stubs (e.g., using the SOAP framework), APIs, or libraries may be provided to client computers 101-104 in order to indicate policy parameters associated with the data protection policy.

Policy parameters for the exemplary data protection policy 500 may include logical values (e.g., yes or no) for some or all of the conditionals 501-507. For example, policy parameters may be used to indicate whether unprotected data sent to the data protection hub 200 is personal account information, whether the unprotected data needs to be re-presented, or whether the unprotected data will be transferred over an untrusted network. Policy parameters specified by a client computer 101 may be sufficient for data protection hub 200 to determine a data protection transformation for the unprotected data.

In some embodiments, the policy schema may specify one or more subsets of conditionals, wherein each subset comprises enough conditionals to determine a data protection transformation. For example, if client computer 101 indicates in policy parameters that unprotected data is not personal account information, is personally identifiable information, and can be de-contexted, then the client computer 101 may not also need to indicate whether the data will be transferred over an untrusted network (e.g., because the latter indication would not affect the determined data protection transformation). Accordingly, client computer 101 may use the policy schema to determine the necessary policy parameters to send to data protection hub 200 for some unprotected data.

IV. Exemplary Data Protection Methods

Figure 6:
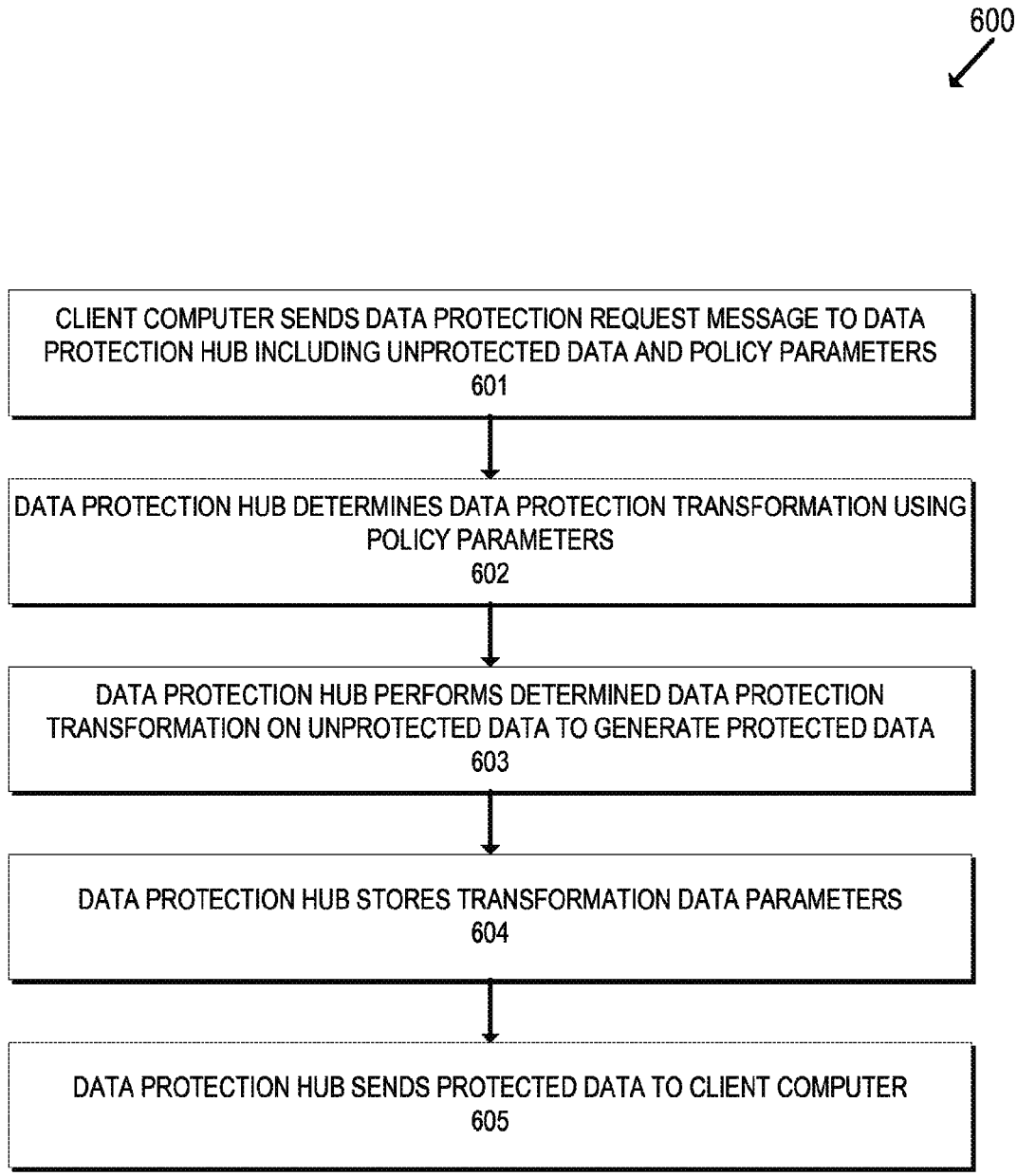
FIG. 6 shows a method 600 for generating protected data at a data protection hub 200.

FIG. 6 shows a method 600 for generating protected data at a data protection hub 200.

At step 601, a client computer 101 sends a data protection request message to the data protection hub 200 including unprotected data and policy parameters. In one example, a client computer 101 may transmit the data protection request message for a user's credit card number. In some embodiments, the credit card number may be present with a plurality of other payment card numbers of other users. The request message may include policy parameters indicating that the unprotected data is personal account information, needs to be represented, and will be transferred over a personal network.

At step 602, data protection hub 200 determines a data protection transformation using the policy parameters. In some embodiments, policy decision layer 220 may be used to determine the data protection transformation. For the example policy parameters described above for step 601, and exemplary data protection policy 500, data protection hub 200 may determine the data protection transformation to be tokenization.

At step 603, data protection hub 200 performs the determined data protection transformation on the unprotected data to generate protected data. In some embodiments, the data protection transformation may be performed using an appropriate component of service layer 230 of data protection hub 200. For example, if the data protection transformation is tokenization on a credit card number, at step 603 tokenization as a service module 234 may use token generator module 253 to generate a secure token.

At step 604, data protection hub 200 stores transformation data parameters associated with the data protection transformation. In some embodiments, the transformation data parameters may be stored in data layer 240. For example, if the data protection transformation is tokenization on a credit card number, at step 604 tokenization as a service module 234 may store a mapping between the credit card number and the secure token in data storage module 241.

At step 605, data protection hub 200 sends the protected data to the client computer 101. In some embodiments, the protected data may be transmitted using data protection abstraction interface 210. For example, if the protected data is a secure token, data protection hub 200 may send the secure token to client computer 101.

It should be noted that method 600 is intended to be descriptive and non-limiting. For example, instead of or in addition to sending the protected data to client computer 101 at step 605, data protection hub 200 may store the protected data. Client computer 101 may subsequently request the protected data.

In addition, a data protection request message may comprise multiple elements of unprotected data, each of which may be associated with different policy parameters. For example, a data protection request message may comprise three data fields: a user's credit card number, email address, and password, and separate policy parameters for each of the data fields.

FIGS. 7-10 described below show exemplary methods for transforming unprotected data to protected data in the form of hashes, masked data, tokens, and encrypted data, respectively. In some embodiments, the method of FIGS. 7-10 may be performed after data protection hub 200 determines a data protection transformation to perform on the unprotected data (e.g., after step 602 in FIG. 6).

Figure 7:
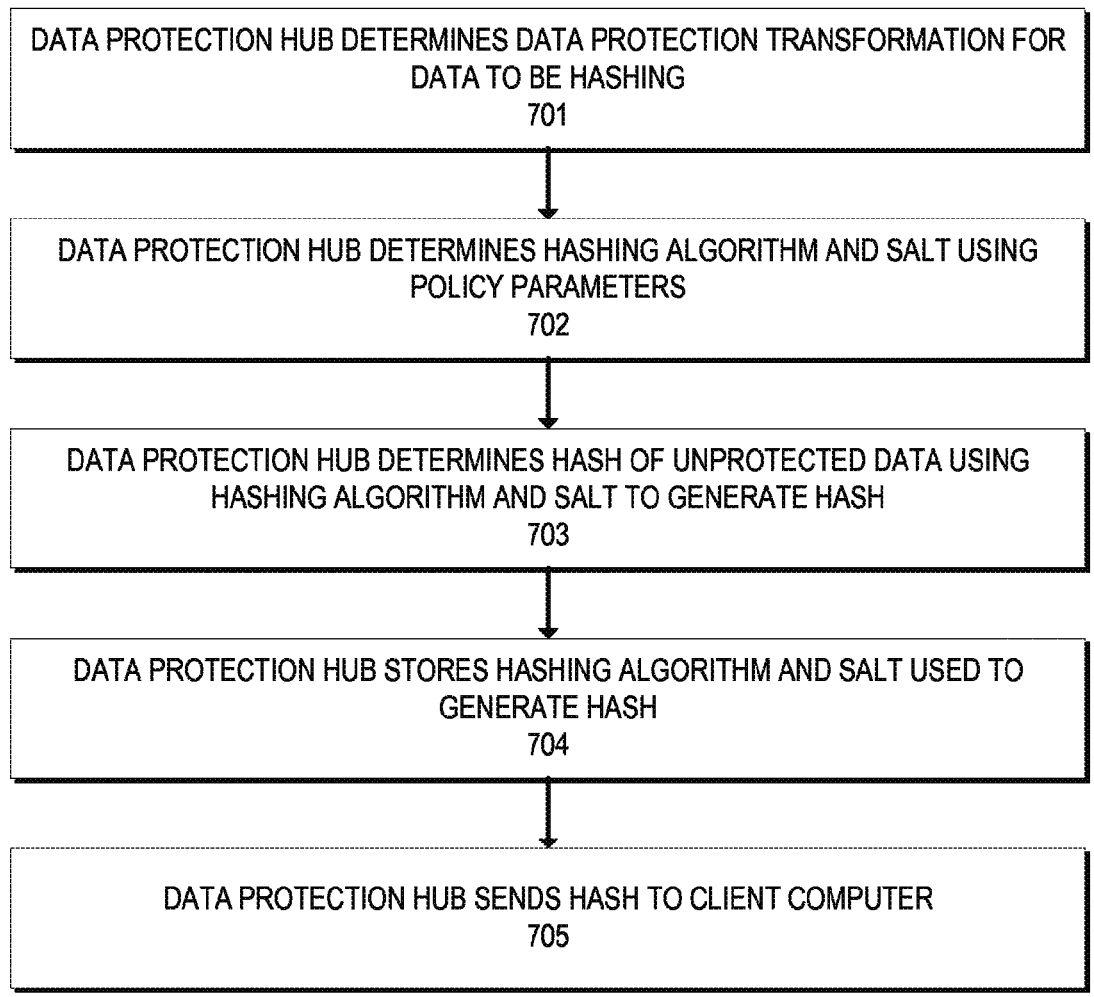
FIG. 7 shows a method for generating protected data by hashing the unprotected data.

FIG. 7 shows a method for generating protected data by hashing the unprotected data.

At step 701, data protection hub 200 determines the data protection transformation for the unprotected data to be hashing. As used herein, "hashing" may refer to any algorithm or function that takes as input data and returns a fixed-size bit string (i.e., a hash), or as otherwise known in the art.

At step 702, data protection hub 200 determines a hashing algorithm and salt using the policy parameters. In some embodiments of the invention, a data protection policy may specify a hashing algorithm or salting methodology to use for the unprotected data. For example, data protection policy 500 shown in FIG. 5 specifies hashing using the SHA-2 or bcyrpt hashing algorithms, depending on the policy parameters associated with the unprotected data.

At step 703, data protection hub 200 determines the hash of the unprotected data using the hashing algorithm and salt. In some embodiments, data protection hub 200 may use hashing as a service module 231 and hashing engine 251 to perform hashing operations.

At step 704, data protection hub 200 stores the hashing algorithm and salt used to generate the hash. In some embodiments, the hashing algorithm and salt may be stored in data layer 240, such as in data storage module 241. The hashing algorithm and salt may be considered transformation data parameters associated with the protected data.

At step 705, data protection hub 200 sends the hash to client computer.

The method of FIG. 7 may performed for any suitable unprotected data, data protection policy, and hashing algorithm. In one example, data protection hub 200 may be used to determine the data protection transformation for a user's password of "abc123". At step 702, in accordance with the data protection policy 500, the hashing algorithm may be determined to be bcrypt, since password is sensitive authentication data and the transformation should be irreversible. At step 703, data protection hub 200 computes the hash of "abc123" (e.g., "$2a$10$5W8SOHEeTJGb"). At step 704, data protection hub 200 stores transformation data parameters including an indication that bcrypt was used as the hashing algorithm in data storage module 241. At step 705, data protection hub 200 sends the hash to client computer 101. Client computer 101 may then, for example, store the hash in a password database.

Figure 8:
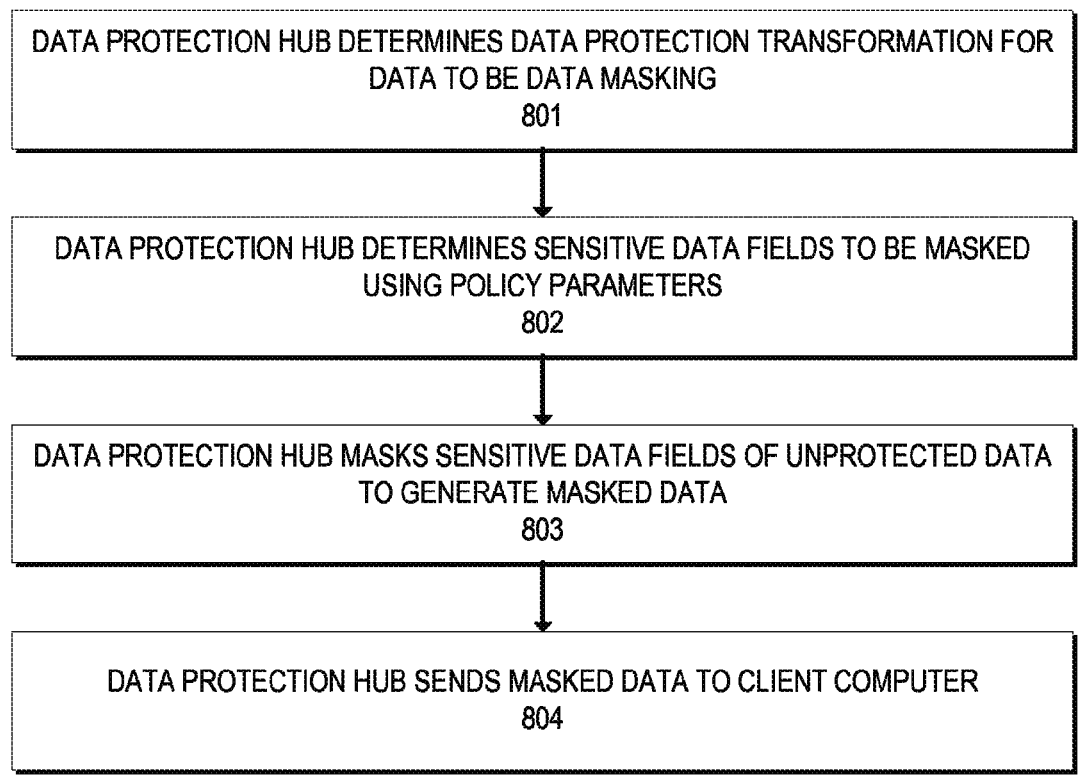
FIG. 8 shows a method for generating protected data by masking the unprotected data.

FIG. 8 shows a method for generating protected data by masking the unprotected data.

At step 801, data protection hub 200 determines the data protection transformation for the unprotected data to be data masking. As used herein, "data masking" may refer to any algorithm or method for de-contexting or removing sensitive information from input data, or as otherwise known in the art. In some embodiments, sensitive data may be masked by removing parts or elements of the data. For example, a standard 16-digit credit card personal account number (PAN) (e.g., "4061-7240-6172-4061") may be masked by removing the seventh digit through the twelfth digit (e.g., "4061-72XX-XXXX-4061"). Thus, an attacker would not be able to cause harm with the remaining digits. In addition, in some embodiments, sensitive data may be protected by moving the data to a different context. For example, a PAN, account expiration date, and card verification value (e.g., CVV2) may be de-contexted by appending the CVV2 to an address field associated with the card holder. Thus, an attacker not knowing the new context of the data would not be able to understand the de-contexted data.

At step 802, data protection hub 200 determines sensitive data fields to be masked using the policy parameters. For example, policy parameters may indicate that the unprotected data is a social security number. Accordingly, data protection hub 200 may determine that the first five digits of the social security number are sensitive, but the last four digits are less sensitive.

At step 803, data protection hub 200 masks the sensitive data fields of the unprotected data to generate masked data. The masked data may comprise a shortened form of the unprotected data or may keep the same length but have placeholder data inserted. For example, for the social security number "123-45-6789", the masked, protected data may comprise "XXX-XX-6789", or simply "6789".

At step 804, data protection hub 200 sends the masked data to the client computer 101.

Figure 9:
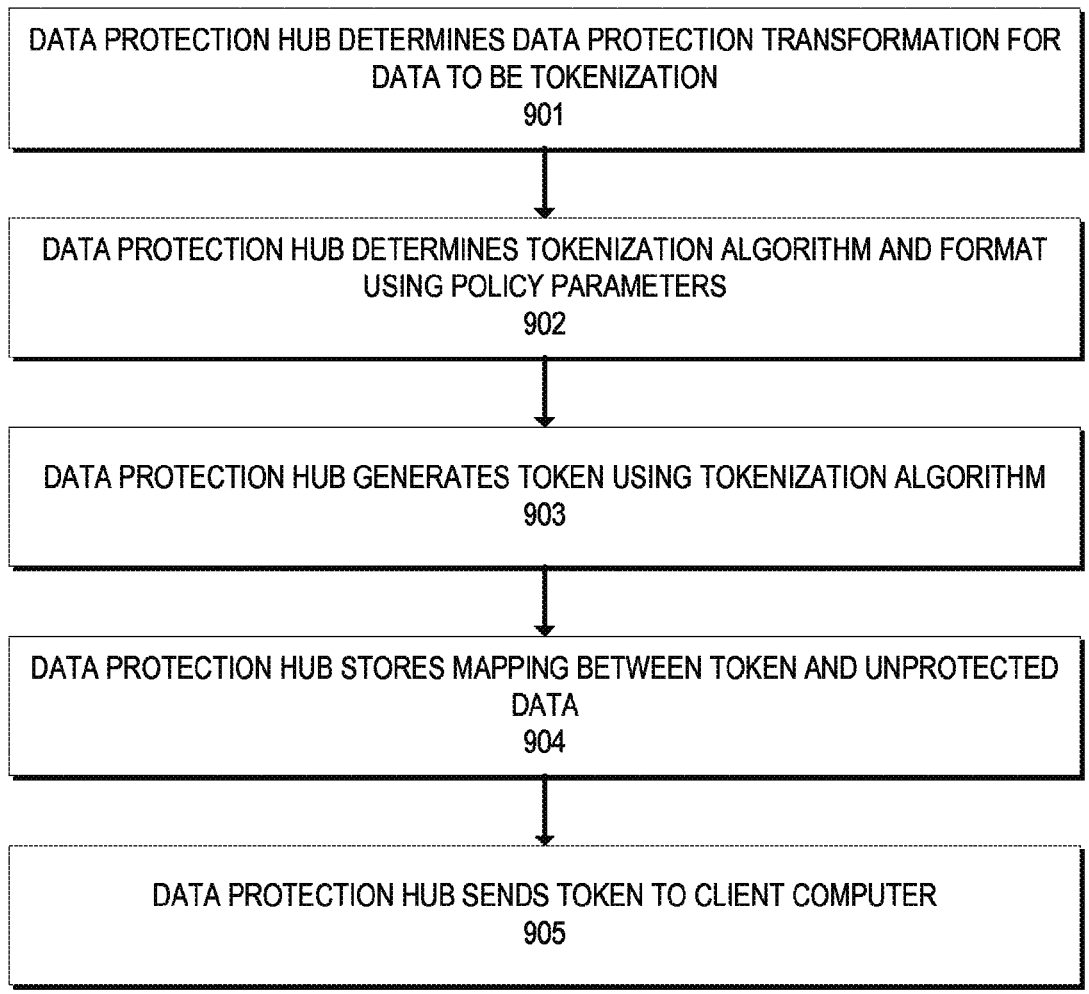
FIG. 9 shows a method for generating protected data by tokenizing the unprotected data.

FIG. 9 shows a method for generating protected data by tokenizing the unprotected data.

At step 901, data protection hub 200 determines the data protection transformation to be tokenization. As used herein, "tokenization" may include substituting a sensitive data element with a non-sensitive element and saving a mapping between the elements, or as otherwise known in the art. An authorized user may subsequently detokenize the token to retrieve the sensitive data.

At step 902, data protection hub 200 determines a tokenization algorithm and format using policy parameters associated with the unprotected data. The tokenization algorithm may include an algorithm to generate statistically random data sequences, or an indication of token generator hardware 253 to use to generate a token. The tokenization format may comprise any information used to determine the format of the token, such as the length of the token, the encoding of the token, the character set used to represent the token, etc.

At step 903, data protection hub 200 generates a token using the tokenization algorithm. The token may be generated using software resident on the data protection hub 200, a hardware token generator 253, a combination of the two, or using any other suitable method.

At step 904, data protection hub 200 stores a mapping between the token and the unprotected data. In some embodiments, the mapping may be stored in data storage module 241. The mapping may be used to retrieve a token associated with some unprotected data, or to retrieve unprotected data associated with a token.

At step 905, data protection hub 200 sends the token to the client computer 101.

Any suitable data may be tokenized. For example, a sensitive 16-digit PAN (e.g., "4061-7240-6172-4061") may be tokenized to produce a token (e.g., "a349ba0530a41169083"). In some circumstances, the token may be used as a substitute for the PAN. For example, a user may use the token in order to pay for a transaction instead of providing the PAN.

Figure 10:
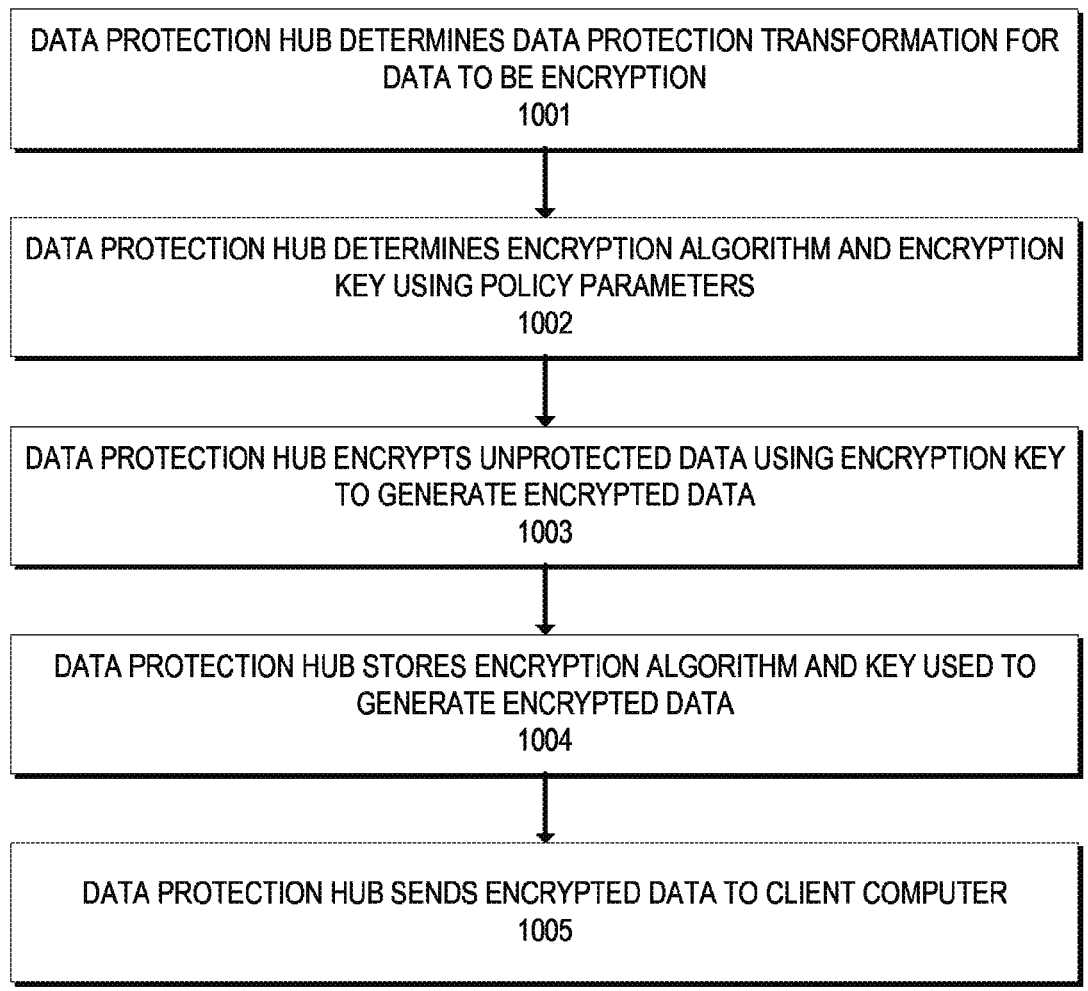
FIG. 10 shows a method for generating protected data by encrypting the unprotected data.

FIG. 10 shows a method for generating protected data by encrypting the unprotected data.

At step 1001, data protection hub 200 determines the data protection transformation for the unprotected to be encryption. As used herein, "encryption" may include any encoding of information so that unauthorized users cannot read it, but authorized users can, or as otherwise known in the art. In various embodiments of the invention, encryption may be perform using symmetric keys, or public/private key pairs.

At step 1002, data protection hub 200 determines an encryption algorithm and encryption key using policy parameters associated with the unprotected data. In some embodiments of the invention, a data protection policy may specify an encryption algorithm associated with policy parameters. For example, data protection policy 500 shown in FIG. 5 specifies encryption using a symmetric key or a public key, depending on the policy parameters associated with the unprotected data. The determined encryption algorithm may comprise a key length, a method of key generation, a method of encrypting data, or any other information used to generate a key and encrypt data. In some embodiments, data protection hub 200 may generate an encryption key using encryption as a service module 235 and/or crypto provider module 254.

At step 1003, data protection hub 200 encrypts the unprotected data using the encryption key to generate protected data. The unprotected data may be encrypted using software resident on the data protection hub 200, a hardware crypto provider 254, a combination of the two, or using any other suitable method.

At step 1004, data protection hub 200 stores the encryption algorithm and encryption key used to generate the encrypted data. In some embodiments, the encryption algorithm may be stored using data storage module 241, and the encryption key may be stored using key manager 242.

At step 1005, data protection hub 200 sends the encrypted data to the client computer 101.

V. Exemplary Data Deprotection Methods

Figure 11:
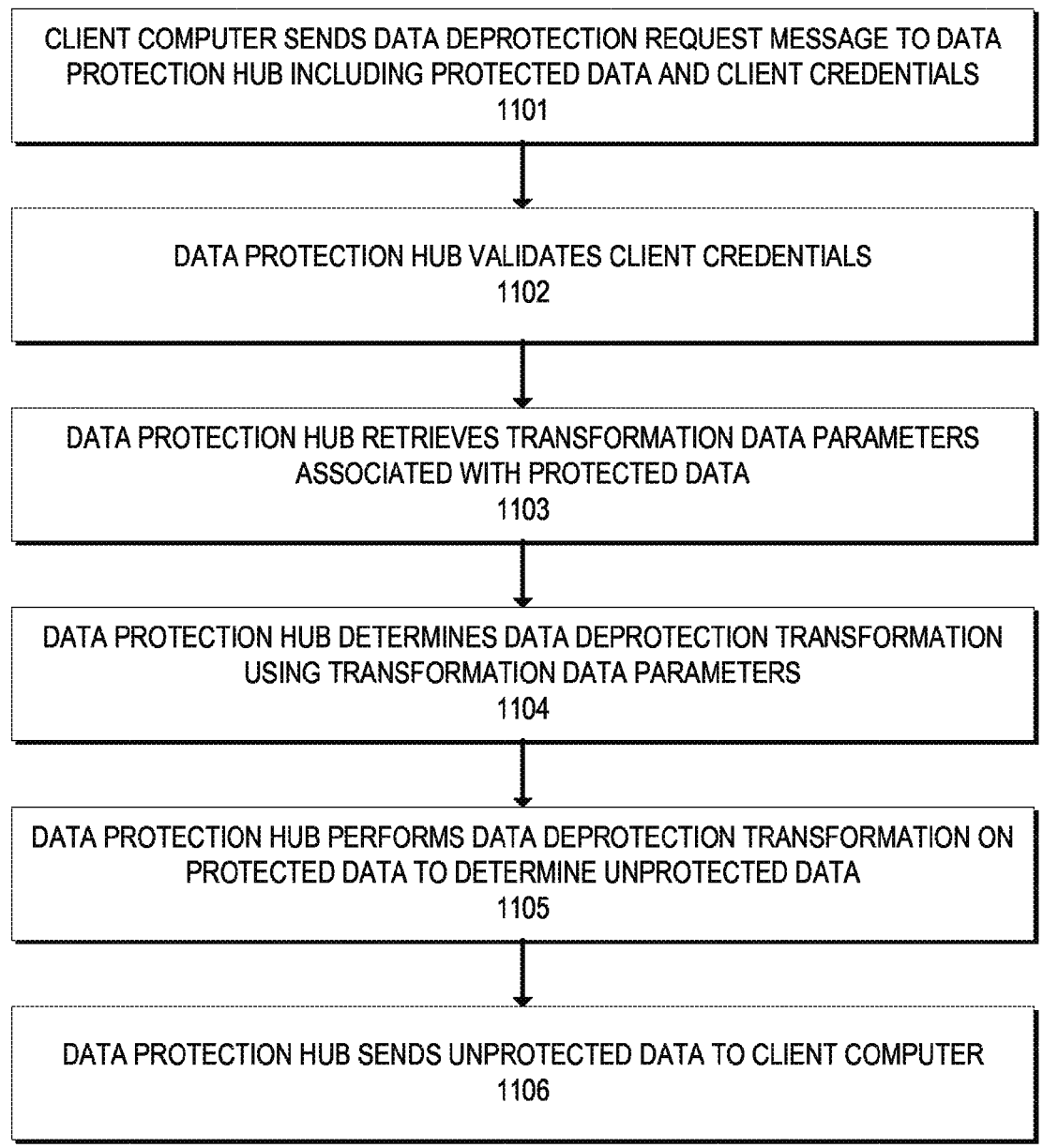
FIG. 11 shows a method for deprotecting data using a data protection hub.

FIG. 11 shows a method 1100 for deprotecting data using a data protection hub 200. In some embodiments, the method of FIG. 11 may be performed after data protection hub 200 protects unprotected data (e.g., after the method of FIG. 6).

At step 1101, a client computer 101 sends a data deprotection request to data protection hub 200 including protected data and client credentials. The protected data may include any data that has been protected by a data protection hub, typically by using a data protection transformation. Client credentials may include any data provided by client computer 101 which allows data protection hub 200 to verify that client computer 101 is authorized to deprotect the protected data, such as a user name and password, a digital signature, etc.

At step 1102, data protection hub 200 validates the client credentials.

At step 1103, data protection hub 200 retrieves transformation data parameters associated with the protected data. The transformation data parameters may typically include any data used to deprotect the protected data. For example, if the protected data is encrypted, then transformation data parameters may include a decryption key. If the protected data is a token, the transformation data parameters may include a mapping associating the token with the unprotected data. In some embodiments of the invention, the transformation data parameters may be retrieved from data storage module 241.

At step 1104, data protection hub 200 determines a data deprotection transformation using transformation data parameters. The data deprotection transformation may include any transformation of protected data to unprotected data, such that the unprotected data was used to generate the protected data. For the example, if the data was protected using encryption, the data deprotection transformation may be a decryption operation.

At step 1105, data protection hub 200 performs the data deprotection transformation using the transformation data parameters. In some embodiments, the data deprotection transformation may be performed using an appropriate component of service layer 230 of data protection hub 200. For example, if the data deprotection transformation is decryption, at step 1105 encryption as a service module 235 may be used to decrypt the protected data.

At step 1106, data protection hub 200 sends the unprotected data to the client computer 101.

Figure 12:
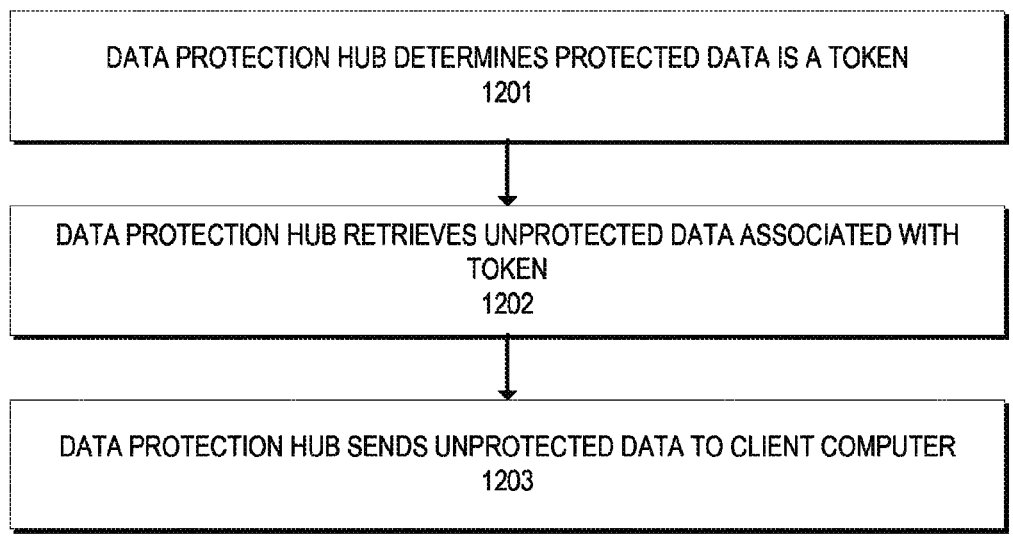
FIG. 12 shows a method for retrieving unprotected data associated with a token using a data protection hub.
Figure 13:
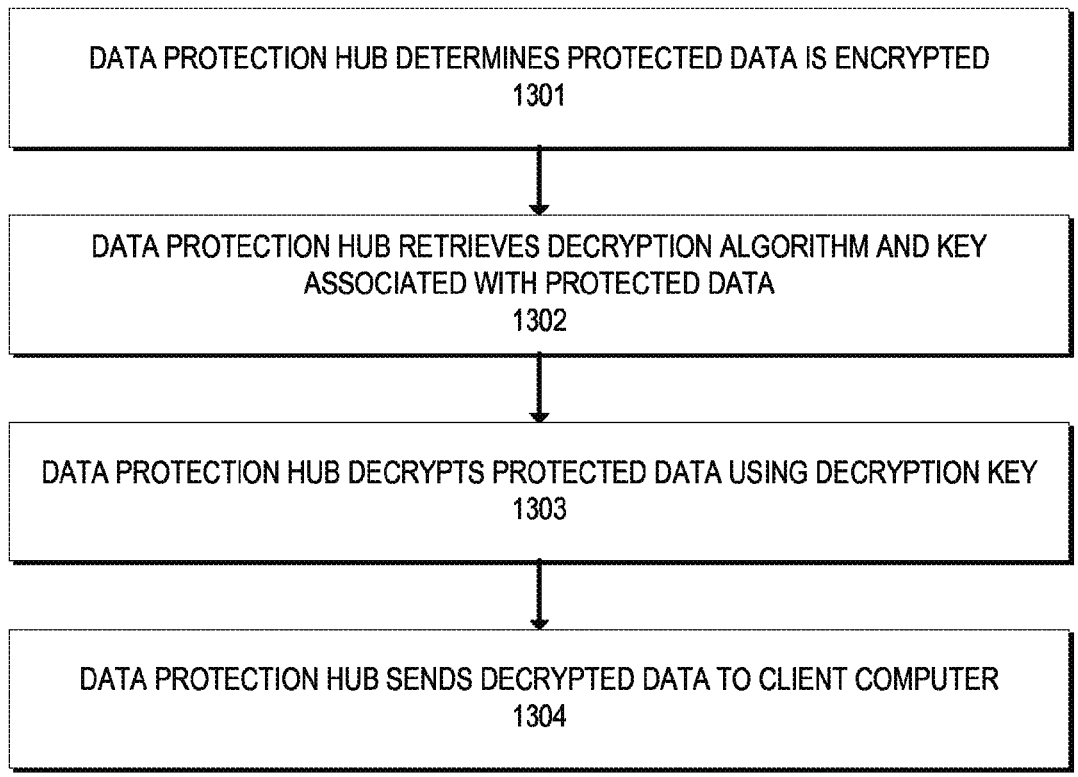
FIG. 13 shows a method for decrypting protected data using a data protection hub.

FIGS. 12 and 13 described below show exemplary methods for transforming protected data in the form of tokens or encrypted data to deprotected data. In some embodiments, the method of FIGS. 12 and 13 may be performed after data protection hub 200 determines a data deprotection transformation for the protected data (e.g., after step 1104).

FIG. 12 shows a method for retrieving unprotected data associated with a token using a data protection hub 200.

At step 1201, data protection hub 200 determines the protected data is a token.

At step 1202, data protection hub 200 retrieves unprotected data associated with the token. In some embodiments, data protection hub 200 may retrieve the unprotected data using a mapping associating the token to the unprotected data that may be retrieved using data storage module 241.

At step 1203, data protection hub 200 sends the unprotected data to client computer 101.

FIG. 13 shows a method for decrypting protected data using a data protection hub 200.

At step 1301, data protection hub 200 determines the protected data is encrypted.

At step 1302, data protection hub 200 retrieves a decryption algorithm and key associated with the protected data. In some embodiments, data protection hub 200 may retrieve the decryption key using key manager 242. At step 1303, data protection hub 200 decrypts the protected data using the decryption key to determine the unprotected data.

At step 1304, data protection hub 200 sends the unprotected data to client computer 101.

VI. Exemplary Data Migration Methods

Figure 14:
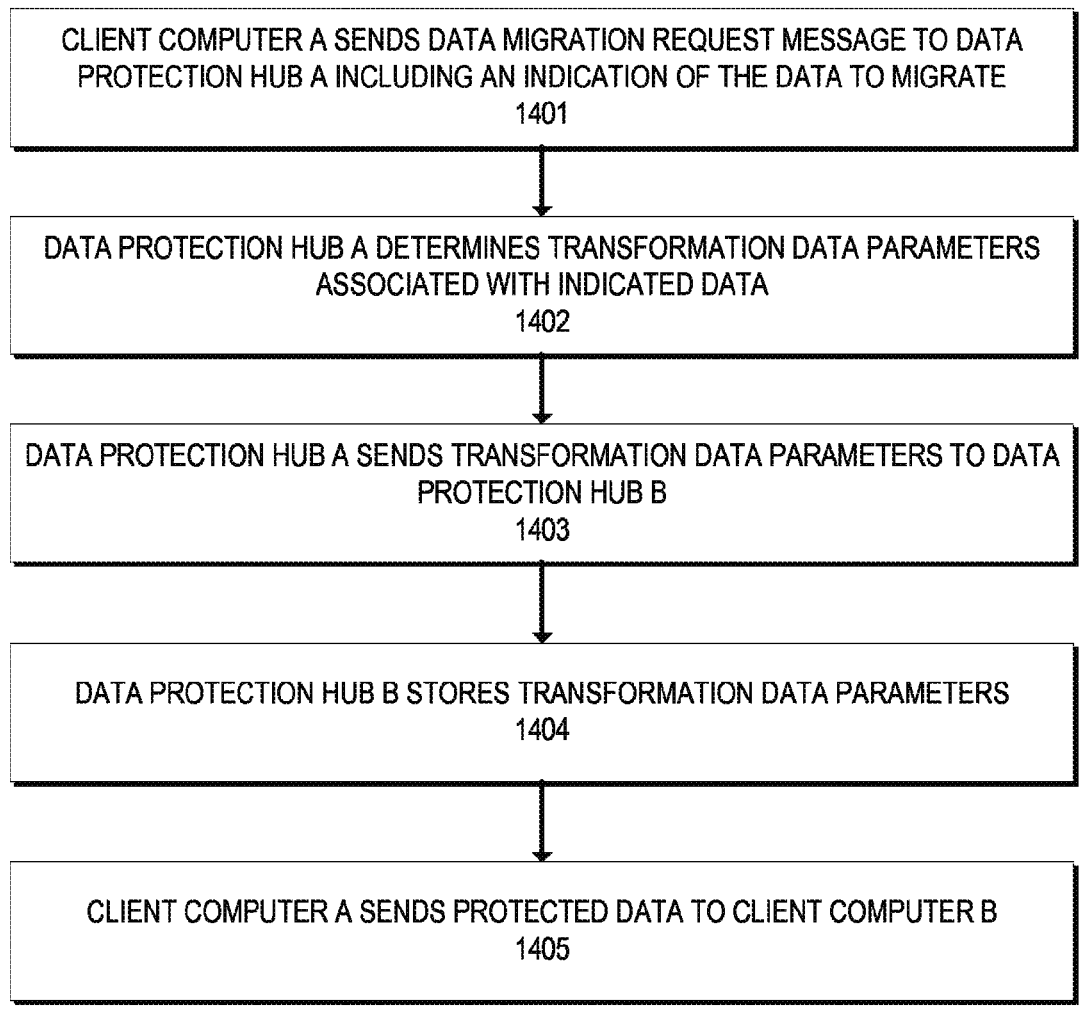
FIG. 14 shows a method for migrating protected data using a data protection hub.

FIG. 14 shows a method for migrating protected data using a data protection hub 200. In some embodiments of the invention, the method described for FIG. 14 may be used with the system described in FIG. 3. In some embodiments, each data protection hub instantiation 313, 323, 333, and 343 may have the structure described for FIG. 2, and the descriptions are herein incorporated.

At step 1401, a client computer A 312 sends a data migration request message to a data protection hub A 313 including an indication of the data to migrate. A data migration request message may be sent by client computer A 312 to request accessibility of protected data associated with the client computer A 312 from a client computer B 323, such that the client computer B 323 may operate a data protection hub to perform data deprotection transformations on the protected data.

In some embodiments of the invention, the indication of data to migrate may comprise protected or unprotected data. In other embodiments, the indication may include an index, tag, or other information sufficient to identify protected data. Thus, the entirety of the protected data need not be transmitted to data protection hub A 313.

At step 1402, data protection hub A 313 determines transformation data parameters associated with the indicated data. In some embodiments of the invention, the transformation data parameters may be retrieved using data storage module 241.

At step 1403, data protection hub A 313 sends the determined transformation data parameters to data protection hub B 323. Data protection hub A 313 may send the transformation data parameters to data protection hub B 323, if, for example, data protection hub B 323 is closer in proximity to client computer B 322. The transformation data parameters may be associated with client computer B 322, so that credentials used by client computer B 322 may serve to authenticate and authorize deprotection of the migrated data. At step 1404, data protection hub B 323 stores the transformation data parameters.

At step 1405, client computer A 312 sends the protected data to client computer B 322. In some embodiments of the invention, the protected data may be sent from client computer A 312 to client computer B 322 without passing through a data protection hub, such as through an untrusted channel. This does not compromise the security of the data, because it is protected, and any secret information (e.g., decryption keys) required to deprotect the data are not transmitted at step 1405. Thus, the efficiency of data migration is improved.

After the method completes, client computer B 322 may access the protected data by sending a data deprotection request to data protection hub B 323. Thus, client computer B 322 now has full access to the migrated data.

The method of FIG. 14 may performed for any suitable protected data and data protection policy. In one example, client computer A 312 may want to send a database of sensitive consumer information to client computer B 322. The sensitive consumer database may have been previously protected using data protection hub A 312. In order to initiate the migration, at step 1401, client computer A 312 sends a data migration request message to data protection hub 313 indicating that the consumer database is to be migrated to client computer B. Then, at step 1402, data protection hub A 313 retrieves transformation data parameters associated with the consumer database. At step 1403, data protection hub A 313 determines that data protection hub B 323 is the most desirable data protection hub (e.g., because client computer B 322 has the fastest connection to data protection hub B 323). Accordingly, data protection hub A 313 sends the transformation data parameters to data protection hub B 323. At step 1404, data protection hub B stores the transformation data parameters. Finally, at step 1405, client computer A 312 sends the consumer database to client computer B 322 over a separate channel (e.g., by mailing a Blu-Ray disc of the database). After the method completes, client computer B 322 may access the consumer database by sending data deprotection requests to data protection hub B 323.

It should be noted that the method of FIG. 14 is intended to be descriptive and non-limiting. In some embodiments, data migration may be performed for two client computers 101 and 102 connecting to a single data protection hub 200. In such embodiments, step 1403 may not need to be performed. Instead, data protection hub 200 may be configured to accept credentials of client computer B 102 to access the protected data.

VII. Exemplary Payment Processing Systems

Figure 15:
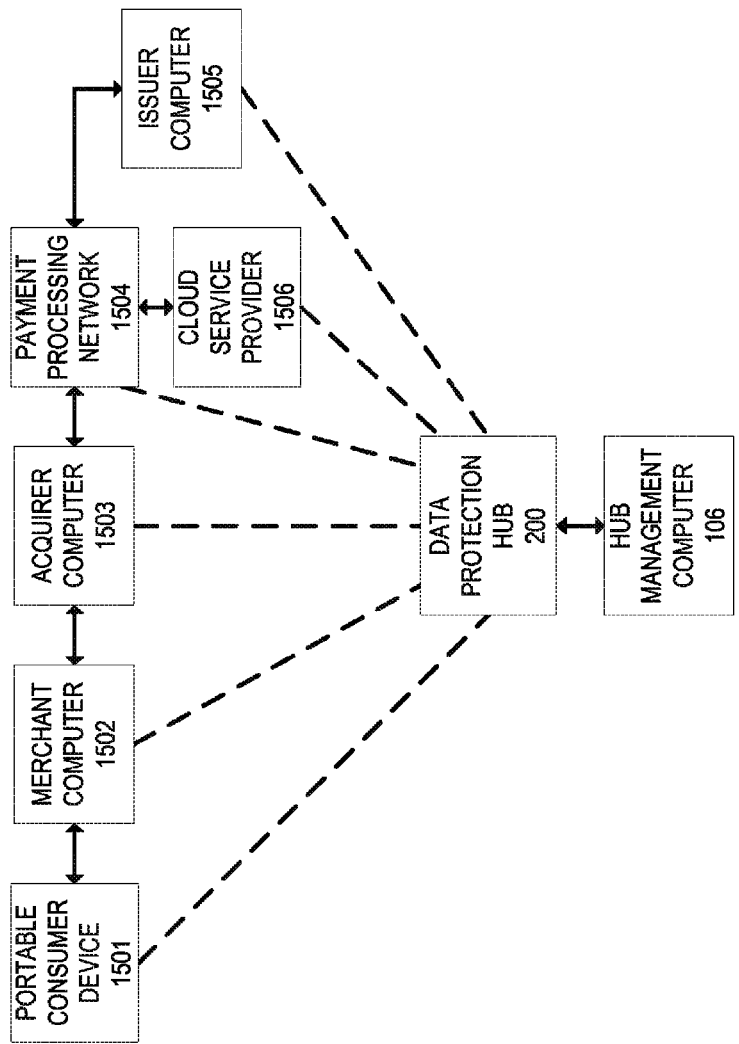
FIG. 15 shows an exemplary system for using a data protection hub according to an embodiment of the invention.

FIG. 15 shows an exemplary system for using a data protection hub according to an embodiment of the invention.

The system comprises consumer (not shown) who may operate a portable consumer device 1501. The consumer may use portable device 1501 to conduct purchase transactions at an access device (not shown) connected to a merchant computer 1502. Merchant computer 1502 may be connected to acquirer computer 1503. Acquirer computer 1503 may be connected to issuer computer 1505 via payment processing network 1504. Payment processing network 1504 may also be connected to cloud service provider 1506.

As used herein, a "cloud service provider" may typically refer to a server or service that provides a distributed, cloud-based, parallel or otherwise separate environment from payment processing network 1504. Cloud service provider 1504 may be used to execute virtual machines (VMs) defined by a payment processing network 1504 or any other suitable party, such as a merchant 1502, acquirer 1503, merchant processor, issuer processor, or any suitable third-party.

As used herein, an "issuer" may typically refer to a business entity (e.g., a bank) that maintains financial accounts for a consumer and often issues a portable consumer device 1501 such as a credit or debit card to the consumer. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant computer 1502, acquirer computer 1503, payment processing network 1504, and issuer computer 1505) may comprise one or more computer apparatuses to enable communications, or to perform one or more of the functions described herein.

The payment processing network 1504 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 1504 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 1504 may use any suitable wired or wireless network, including the Internet.

In a typical payment transaction, the consumer purchases a good or service at merchant 1502 using a portable consumer device 1501. The user's portable consumer device 1501 can interact with an access device at a merchant associated with merchant computer 1502. For example, the consumer may tap the portable consumer device 1501 against an NFC reader in the access device 102. Alternately, the consumer may indicate payment details to the merchant electronically, such as in an online transaction.

An authorization request message is generated by the access device and is then forwarded to the acquirer computer 1503. After receiving the authorization request message, the authorization request message is then sent to the payment processing network 1504. The payment processing network 1504 then forwards the authorization request message to the corresponding issuer computer 1505 associated with the issuer of the portable consumer device 1501.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 1505 receives the authorization request message, the issuer computer 1505 sends an authorization response message back to the payment processing network 1504 to indicate whether the current transaction is authorized (or not authorized). In some embodiments, issuer computer 1505 may examine the testing transaction score to determine whether the current transaction should be authorized. The payment processing network 1504 then forwards the authorization response message back to the acquirer 1503. In some embodiments, payment processing network 1504 may decline the transaction even if issuer computer 1505 has authorized the transaction, for example depending on the value of the fraud risk score or testing transaction score. The acquirer 1503 then sends the response message back to the merchant computer 1502.

An "authorization response message" may be an electronic message reply to an authorization request message generated by an issuing financial institution or a payment processing network. The authorization response message may include, by way of example, one or more of the following status indicators: "Approval"—indicating a transaction was approved; "Decline"—indicating a transaction was not approved; or "Call Center"—indicating a response is pending more information and the merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant computer 1502 receives the authorization response message, the access device coupled to the merchant computer 1502 may then provide the authorization response message for the consumer. The response message may be displayed on the contactless access device, or may be printed out on a receipt. Alternately, if the transaction is an online transaction, the merchant may provide a web page or other indication of the authorization response message.

At the end of the day, a normal clearing and settlement process can be conducted by the payment processing network 1504. A clearing process is a process of exchanging financial details between an acquirer and an issuer to facilitate posting of transactions to a customer's payment account and reconciliation of the user's settlement position.

In some embodiments of the invention, portable consumer device 1501, merchant computer 1502, acquirer computer 1503, payment processing network 1504, and issuer computer 1505 may make use of data protection hub 200.

For example, some embodiments of the invention may be used to enable token-based payment authentication. In one such embodiment, payment processing network 1504 may define a data protection policy at data protection hub 200 specifying an industry standard tokenization method. Issuer computer 1505 may then generate a plurality of one time use tokens by submitting a data protection request comprising the personal account number (PAN) to the data protection hub 200. Issuer computer 1505 may then load consumer device 1501 (e.g., a smart card) with the plurality of one time use tokens. When a consumer conducts a payment transaction, portable consumer device may provide one of the one time use tokens to merchant computer 1502. Merchant computer 1502 may then send an authorization request message to issuer computer 1505 including the token. Issuer computer 1505 may then send a data deprotection request message to the data protection hub 200 indicating the token. Data protection hub 200 may then retrieve the PAN associated with the token and send the PAN to the issuer computer 1505. Issuer computer 1505 may subsequently retrieve a consumer's account based on the PAN and determine whether the transaction should be approved or declined. If approved, the issuer may return an authorization response message completing the transaction.

In another example, payment processing network 1504 may send protected data to cloud service provider 1506. For example, payment processing network 1504 may maintain some or all transaction processing logic at cloud service provider 1506. In order for the cloud service provider 1506 to deprotect the data, the cloud service provider 1506 may send a data deprotection request message to data protection hub 200. Cloud service provider 1506 may then use the deprotected data for any suitable method.

In yet other examples, multiple systems within the payment processing network 1504 may use data protection hub 200 to provide conformance to payment card industry standards or other data protection standards.

VIII. Exemplary Computer Apparatuses

Figure 16:
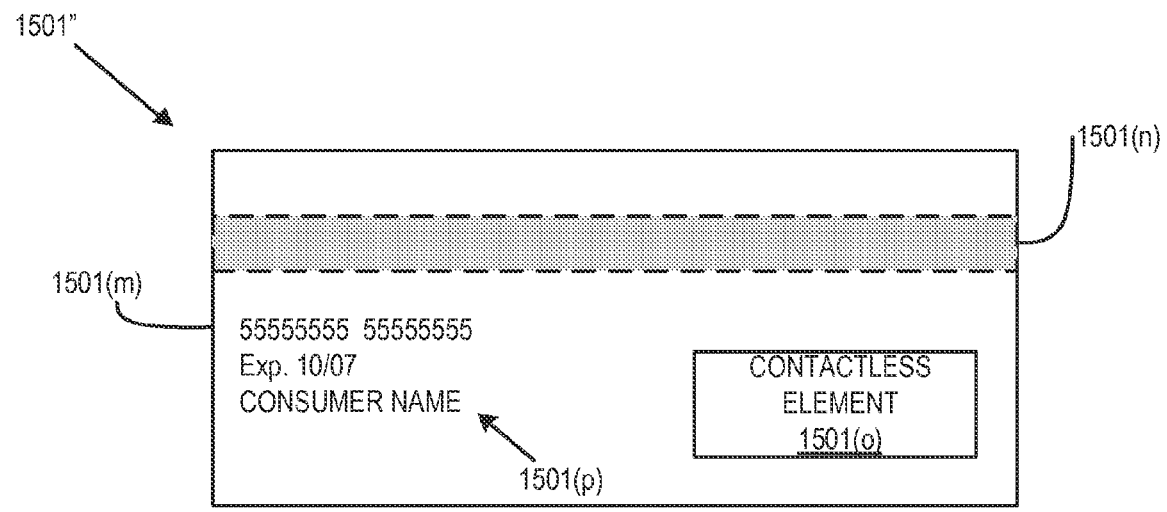
FIG. 16 shows an example of a payment device in the form of a card.

FIG. 16 shows an example of a payment device 1501" in the form of a card. As shown, the payment device 1501" comprises a plastic substrate 1501(m). In some embodiments, a contactless element 1501(o) for interfacing with an access device may be present on, or embedded within, the plastic substrate 1501(m). User information 1501(p) such as an account number, expiration date, and/or a user name may be printed or embossed on the card. A magnetic stripe 1501(n) may also be on the plastic substrate 1501(m). In some embodiments, the payment device 1501" may comprise a microprocessor and/or memory chips with user data stored in them.

As noted above and shown in FIG. 16, the payment device 1501" may include both a magnetic stripe 1501(n) and a contactless element 1501(o). In some embodiments, both the magnetic stripe 1501(n) and the contactless element 1501(o) may be in the payment device 1501". In some embodiments, either the magnetic stripe 1501(n) or the contactless element 1501(o) may be present in the payment device 1501".

Figure 17:
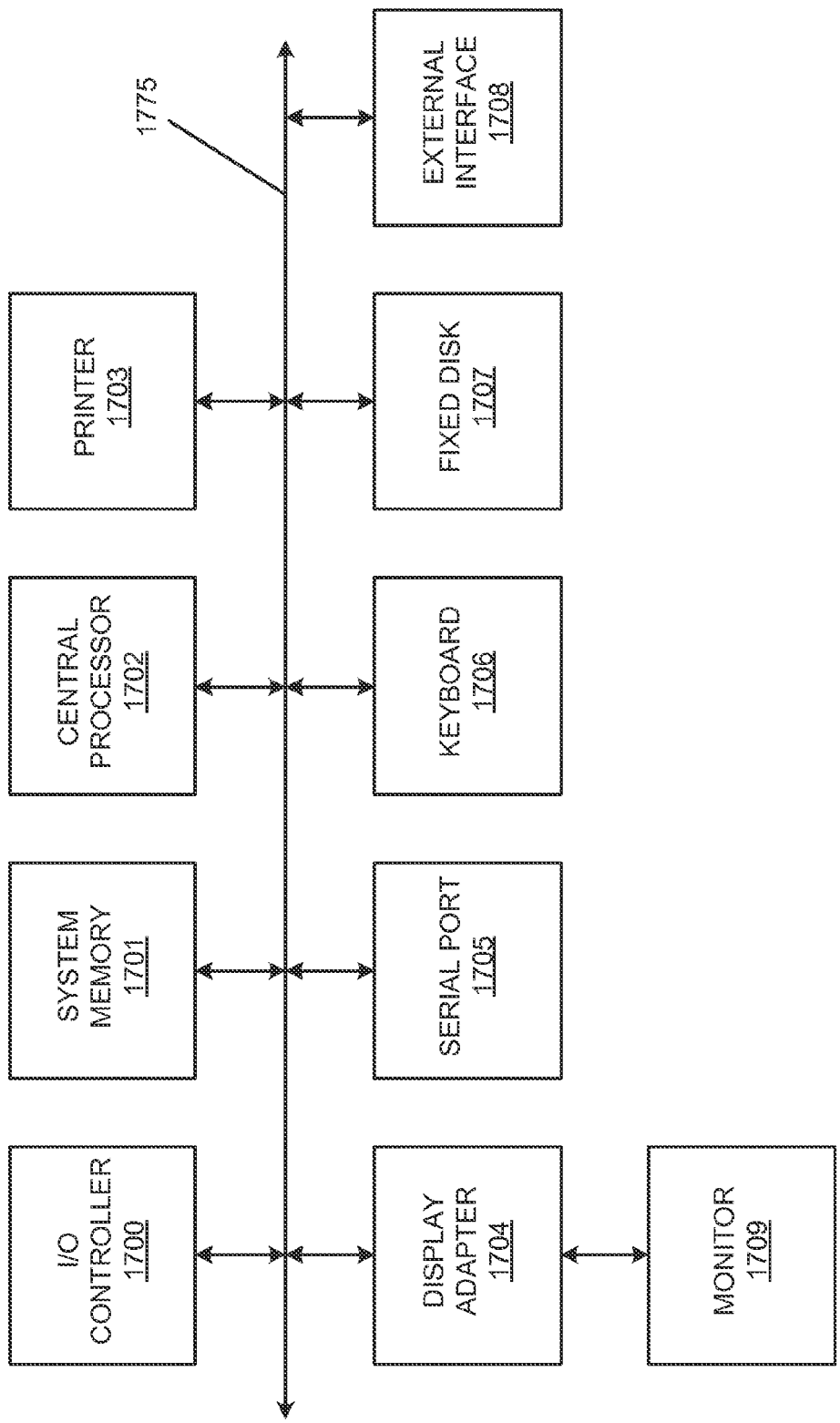
FIG. 17 is a high level block diagram of a computer system that may be used to implement any of the entities or components described for embodiments of the invention.

FIG. 17 is a high level block diagram of a computer system that may be used to implement any of the entities or components described above. The subsystems shown in FIG. 17 are interconnected via a system bus 1775. Additional subsystems include a printer 1703, keyboard 1706, fixed disk 1707, and monitor 1709, which is coupled to display adapter 1704. Peripherals and input/output (I/O) devices, which couple to I/O controller 1700, can be connected to the computer system by any number of means known in the art, such as a serial port. For example, serial port 1705 or external interface 1708 can be used to connect the computer apparatus to a wide area network such as the Internet, a mouse input device, or a scanner. The interconnection via system bus 1775 allows the central processor 1702 to communicate with each subsystem and to control the execution of instructions from system memory 1701 or the fixed disk 1707, as well as the exchange of information between subsystems. The system memory 1701 and/or the fixed disk may embody a computer-readable medium.

IX. Additional Embodiments

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A data protection hub, comprising:
a hardware random number generator configured to generate random numbers;
a cryptoprocessor configured to perform cryptographic operations;
a processor coupled to the hardware random number generator and the cryptoprocessor and configured for executing code;
networking apparatus configured to receive from a client computer, a data protection request message comprising unprotected data, a data protection policy file and one or more policy parameters;
a non-transitory computer-readable storage medium, comprising code executable by the processor for:
determining a data protection transformation by parsing the data protection policy file, wherein the data protection policy file is used to determine the data protection transformation based on the one or more policy parameters;
selecting one or more of the hardware random number generator or the cryptoprocessor based on the determined data protection transformation;
performing, using the selected one or more of the hardware random number generator or the cryptoprocessor, the data protection transformation on the unprotected data to generate protected data, wherein the data protection transformation comprises:
hashing the unprotected data using one of a plurality of hashing algorithms, based on the determined data protection transformation; and
masking sensitive data fields of the unprotected data based on further determining that the sensitive data fields includes unprotected data; and
the networking apparatus further configured to send the protected data, to the client computer.

2. The data protection hub of claim 1, the method further comprising:
determining, using the one or more policy parameters an encryption algorithm and encryption key, wherein the data protection transformation encrypts the unprotected data using the encryption algorithm and encryption key.

3. The data protection hub of claim 1, the method further comprising:
determining, using the one or more policy parameters, a tokenization algorithm and format, wherein the data protection transformation tokenizes the unprotected data using the tokenization algorithm and format.

4. The data protection hub of claim 1, the method further comprising:
receiving the protected data;
performing a data deprotection transformation on the protected data to determine the unprotected data; and
sending the unprotected data.

5. The data protection hub of claim 1, the method further comprising:
receiving a data migration request message comprising an indication of the protected data to migrate;
determining transformation data parameters associated with the protected data; and
sending the transformation data parameters to a second data protection hub.

6. A computer-implemented method comprising:
receiving, by a processor, a data protection request message from a client computer, the message comprising unprotected data, a data protection file and one or more policy parameters;
determining, by the processor, a data protection transformation by parsing the data protection policy file, wherein the data protection policy file is used to determine the data protection transformation based on the one or more policy parameters;
selecting one or more of a hardware random number generator or a cryptoprocessor based on the determined data protection transformation, wherein:
the hardware random number generator generates random numbers, and
the cryptoprocessor performs cryptographic operations;
performing, using the selected one or more of the hardware random number generator or the cryptoprocessor, the data protection transformation on the unprotected data to generate protected data, wherein the data protection transformation comprises:
hashing the unprotected data using one of a plurality of hashing algorithms, based on the determined data protection transformation; and
masking sensitive data fields of the unprotected data based on further determining that the sensitive data fields includes unprotected data; and
sending, by the processor, the protected data to the client computer.

7. The method of claim 6, the method further comprising:
determining, using the one or more policy parameters, an encryption algorithm and encryption key, wherein the data protection transformation encrypts the unprotected data using the encryption algorithm and encryption key.

8. The method of claim 6, the method further comprising:
determining, using the one or more policy parameters, a tokenization algorithm and format, wherein the data protection transformation tokenizes the unprotected data using the tokenization algorithm and format.

9. The method of claim 6 further comprising:
receiving, by the processor, the protected data;
performing, by the processor, a data deprotection transformation on the protected data to determine the unprotected data; and
sending, by the processor, the unprotected data.

10. The method of claim 6 further comprising:
receiving a data migration request message comprising an indication of the protected data to migrate;
determining transformation data parameters associated with the protected data; and
sending the transformation data parameters to a second data protection hub.

* * * * *